(12) United States Patent
Dasgupta et al.

(10) Patent No.: US 12,553,871 B2
(45) Date of Patent: Feb. 17, 2026

(54) CONVERSION OF LONG CELL DATA TO SHORT CELL EQUIVALENT

(71) Applicant: Board of Regents, The University of Texas System, Austin, TX (US)

(72) Inventors: Purnendu K Dasgupta, Arlington, TX (US); Akinde F Kadjo, Arlington, TX (US); Charles Phillip Shelor, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1196 days.

(21) Appl. No.: 17/226,813

(22) Filed: Apr. 9, 2021

(65) Prior Publication Data

US 2021/0405003 A1    Dec. 30, 2021

Related U.S. Application Data

(60) Provisional application No. 63/008,238, filed on Apr. 10, 2020.

(51) Int. Cl.
*G01N 30/86* (2006.01)

(52) U.S. Cl.
CPC ..... *G01N 30/8693* (2013.01); *G01N 30/8617* (2013.01); *G01N 30/8624* (2013.01); *G01N 2030/8648* (2013.01)

(58) Field of Classification Search
CPC ........... G01N 30/8693; G01N 30/8617; G01N 30/8624; G01N 2030/8648
See application file for complete search history.

(56) References Cited

U.S. PATENT DOCUMENTS

| | | | | |
|---|---|---|---|---|
| 6,542,231 B1* | 4/2003 | Garrett | .............. | G02B 6/032 385/12 |
| 7,847,944 B2* | 12/2010 | Buettner | .............. | G01N 21/274 356/243.1 |

OTHER PUBLICATIONS

Wahab et al. (Sampling frequency, response times and embedded signal filtration in fast, high efficiency liquid chromatography: A tutorial, Analytica Chimica Acta, vol. 907, Feb. 11, 2016, pp. 31-44) (Year: 2016).*

* cited by examiner

*Primary Examiner* — Larry D Riggs, II
*Assistant Examiner* — Ghazal Sabour
(74) *Attorney, Agent, or Firm* — Maynard Nexsen PC; John P. Zimmer

(57) ABSTRACT

A method of converting longer path cell signal data to shorter path cell signal data comprising: obtaining a longer path absorbance signal tracing and a shorter path absorbance signal tracing for at least one analyte band under the same conditions; obtaining an approximate superimposable match between the longer path absorbance signal tracing and the shorter path absorbance signal tracing using an amplitude scaling factor and one or more parameters derived from a dispersion model that accounts for dispersion differences between a short cell and a long cell; and applying the dispersion model in reverse using the derived parameters to future longer path absorbance signal traces from the longer path cell signal data to generate the shorter path cell signal data.

29 Claims, 16 Drawing Sheets

| Flow | | | | | What The Detector Sees | Step Difference |
|---|---|---|---|---|---|---|
| 0 | 0 | 0 | 0 | 0 | 0 | 0 |
| 1 | 0 | 0 | 0 | 0 | 1 | 1 |
| 3 | 1 | 0 | 0 | 0 | 4 | 3 |
| 7 | 3 | 1 | 0 | 0 | 11 | 7 |
| 11 | 7 | 3 | 1 | 0 | 22 | 11 |
| 14 | 11 | 7 | 3 | 1 | 36 | 14 |
| 16 | 14 | 11 | 7 | 3 | 51 | 16 |
| 17 | 16 | 14 | 11 | 7 | 65 | 17 |

CONVERSION OF LONG CELL DATA TO SHORT CELL EQUIVALENT

RELATED APPLICATION DATA

The present application claims priority to U.S. Provisional Patent Application Ser. No. 63/008,238 filed Apr. 10, 2020 which is incorporated herein by reference in its entirety.

GOVERNMENT SPONSORSHIP

This invention was made with government support under grant number CHE-1506572 from the US National Science Foundation (NSF) and in part by grant number 80NSSC19K0805 awarded by the National Aeronautics and Space Administration (NASA). The US government has certain rights in this invention.

TECHNICAL FIELD

The invention is generally related to chromatography, and, more specifically, to absorbance detection for chromatography.

BACKGROUND

There is a variety of reasons to miniaturize liquid chromatography (LC): less liquid consumption contributes to greater greenness, along with performance benefits. A decrease in the column bore is accompanied by a decrease in flow rate, with the detection volume (that in part controls the response time) correspondingly decreasing as well. In terms of its commercial success, LC is at the forefront of analytical instrumentation, with UV-VIS absorbance detectors (ADs) being the ubiquitous sensors of choice. Because of their higher cost and complexity, other sensors, such as mass spectrometry, are unlikely to simply replace a nondestructive AD that can be used ahead of a mass spectrometer to provide robust quantitation. However, converting long cell detection data to short cell equivalents has proven to be challenging due to dispersion differences between a long cell and a short cell. Methods that can eliminate dispersion from longer path cell data are needed for such conversions to be possible, especially those that can do so with minimal loss of the signal to noise ratio of the long cell case.

SUMMARY

In an aspect, a method of converting longer path cell signal data to shorter path cell signal data in a flow-through optical absorbance detector recording passage of transient analyte bands, comprises (a) obtaining a longer path absorbance signal tracing and a shorter path absorbance signal tracing for at least one analyte band under the same conditions; (b) obtaining an approximate superimposable match between the longer path absorbance signal tracing and the shorter path absorbance signal tracing using an amplitude scaling factor and one or more parameters derived from a dispersion model that accounts for dispersion differences between a short cell and a long cell; and (c) applying the dispersion model in reverse using the same parameters derived in (b) to future longer path absorbance signal traces from the longer path cell signal data to generate the shorter path cell signal data, wherein the longer path cell signal data comprises the longer path absorbance signal tracing and the shorter path cell signal data comprises the shorter path absorbance signal tracing. The method is equally applicable to liquid or gas chromatography.

In some embodiments, the dispersion model is a single exponential decay model; and an analyte concentration $C_0$ in each fluid element of a short cell signal array ($S_i$, wherein t ranging from t=0 to t=∞) exponentially disperses as $C_0 \beta e^{-\alpha t}$, a dispersed sum of all fluid elements at each time t constitutes the long cell signal array ($L_i$, t=0–∞), and α and β together constitute a single adjustable parameter interrelated by the conservation principle through $\beta = 1-\exp(-\alpha)$ and further that β<1, and short cell data $S_i$ being derived from $$S_i = (L_i - L_{i-1} * e^{-\alpha})/\beta.$$

In some instances, the dispersion model is a double exponential decay model; and the analyte concentration $C_0$ in each fluid element of a short cell signal array ($S_i$, t ranging from t=0 to t=∞) exponentially disperses as $C_0(\beta_1 e^{-\alpha t} + \beta_2 e^{-\gamma t})$ and a dispersed sum of all fluid elements at each time t constitutes a long cell signal array ($L_i$, t=0–∞).

In some cases, the dispersion model is a multiple exponential decay model that comprises n independent preexponential coefficients and n independent exponential coefficients and has 2n-1 independent adjustable parameters, through application of the conservation principle.

The dispersion model can be a generalized Gaussian curve, a Lorentzian curve, an exponentially modified Gaussian (EMG) function, or a polynomial modified Gaussian (PMG) function.

In some embodiments, the dispersion model comprises a linear change of analyte concentration along a time axis.

Methods described herein can further comprise improving a signal to noise ratio (SNR) of the generated shorter path cell data by applying a noise reduction filter to the long cell signal data prior to any processing. In some cases, the noise reduction filter comprises a moving average filter (MAF). The MAF can comprise a rectangular kernel, a triangular kernel, a Gaussian kernel, or a polynomial function kernel.

In some embodiments, the noise reduction filter comprises a moving average filter (MAF), a Butterworth filter (BF), a Savitsky-Golay filter (SGF), or a Chebyshev filter (CF). The Butterworth filter is of $5^{th}$ order in some cases. The SGF is of the $5^{th}$ order in some cases. The CF can be of the $5^{th}$ order in some cases.

In some embodiments, methods described herein can improve a signal to noise ratio (SNR) of the generated shorter path cell data by further applying a noise reduction filter to the generated short cell signal data.

Methods described herein can further comprise removing satellite peaks from final processed data. In some cases, removing a satellite peak from the final processed data, comprises applying the following equation to the final processed data:

$$S_{ns,i} = \frac{1}{1-a} * S_{s,i} - a * S_{ns,i-n}.$$

where $S_{ns}$ is a time dependent signal expected without any satellite peak, $S_{s,i}$ is the observed signal including a satellite peak, a is a ratio of the satellite peak amplitude to an expected principal peak without satellites, the expected satellite peak appearing n time units after the principal peak; and i referring to a point in time ranging from zero to infinity.

Methods described herein can further comprise (a) dividing a signal area of a peak trace of the long cell signal data ($L_i$) by a signal area of a peak trace of the short cell signal data ($S_i$) in a training set to obtain a scaling factor f, and multiplying the $S_i$ data by f so that the multiplied short cell signal array ($MS_i$) has the same area as the $L_i$ signal data array, (b) reversing dispersion in $L_i$ to create a short cell data array ($NS_i$) using:

$$NS_i = (L_i - L_{i-1} * e^{-\alpha})/\beta$$

by choosing a value of $\alpha$ that results in a best match of $NS_i$ with $MS_i$ based on a lowest sum of squared residuals, wherein $\beta$ is automatically defined through the conservation principle; (c) applying a noise reduction filter to a long cell signal data set that is to be converted to a corresponding short cell signal data without dispersion; and (d) reversing dispersion in $L_i$ to create simulated short cell signal data using the equation in (b) using a best-fit value of $\alpha$.

In some instances, methods described herein further comprise (e) multiplying by a scaling factor to a short cell path of specified length.

In some cases, methods described herein further comprise (f) applying a final noise reduction filter.

In another aspect, a method of converting short column chromatographic separation data for a multiplicity of analytes, represented by detector response signal as a function of time, to corresponding long column chromatographic separation data, comprises (a) generating a short column separation signal tracing and a long column signal tracing for a given mixture of analytes under the same conditions; (b) obtaining an approximate superimposable match between the short column signal tracing and the long column signal tracing assuming each analyte moves at a unique velocity along the column and disperses in a analyte-specific manner along the column; (c) deriving one or more unique dispersion parameters from a dispersion model that accounts for dispersion differences of each analyte band between the short column and the long column; and (d) applying the dispersion model using the dispersion parameters derived in (c) to future short column signal traces to generate predicted longer column chromatographic separation data, wherein the predicted long column chromatographic separation data comprises long column signal tracing that would be hypothetically obtained on a longer column.

In some embodiments, the dispersion model of the chromatographic separation method is a single exponential decay model; wherein an analyte concentration $C_0$ in each fluid element of a short cell signal array ($S_t$, t ranging from t=0 to t=∞) exponentially disperses as $C_0 \beta e^{-\alpha t}$, and a dispersed sum of all fluid elements at each time t constitutes the long cell signal array ($L_t$, t=0-∞); and wherein $\alpha$ and $\beta$ together constitute a single adjustable parameter interrelated by the conservation principle through $\beta = 1 - \exp(-\alpha)$ and further that $\beta < 1$, and short cell data $S_i$ being derived from $$S_i = (L_i - L_{i-1} * e^{-\alpha})/\beta.$$

In some instances, the dispersion model of the chromatographic separation method is a double exponential decay model; and the analyte concentration $C_0$ in each fluid element of a short cell signal array ($S_t$, wherein t ranging from t=0 to t=∞) exponentially disperses as $C_0(\beta_1 e^{-\alpha t} + \beta_2 e^{-\gamma t})$ and a dispersed sum of all fluid elements at each time t constitutes a long cell signal array ($L_t$, t=0-∞).

The method of converting short column chromatographic separation data, wherein the dispersion model is a multiple exponential decay model that comprises n independent preexponential coefficients and n independent exponential coefficients and has 2n-1 independent adjustable parameters, through application of the conservation principle.

In some embodiments, the dispersion model of the chromatographic separation method is a generalized Gaussian curve, a Lorentzian curve, an exponentially modified Gaussian (EMG) function, or a polynomial modified Gaussian (PMG) function.

For the chromatographic separation method, dispersion parameters(s) for each analyte are related by an empirically derived relationship to the respective axial velocity of that analytes, such as by a polynomial function.

DETAILED DESCRIPTION

Figure 1A:
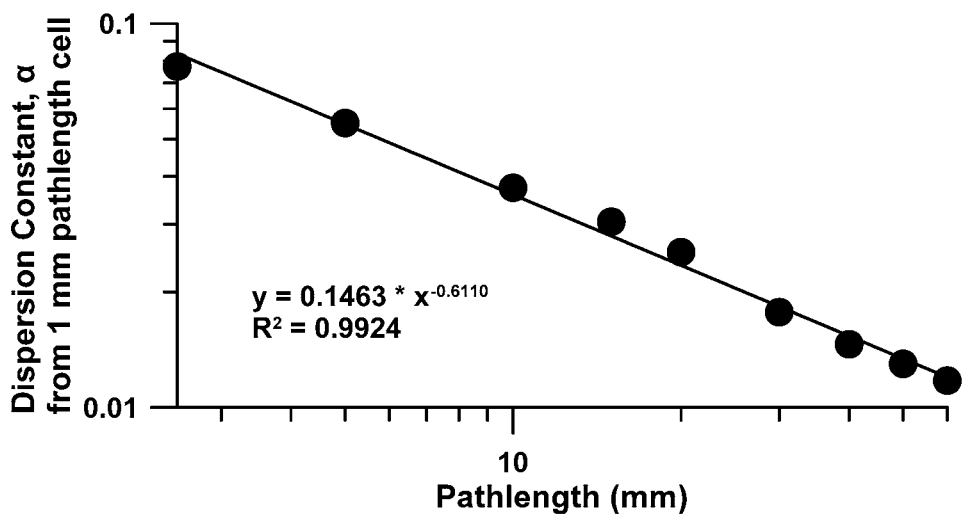
FIGS. 1A-1E show sequential steps and formulae to correct dispersion from a long cell path length to a short cell path length according to methods described herein.
Figure 1B:
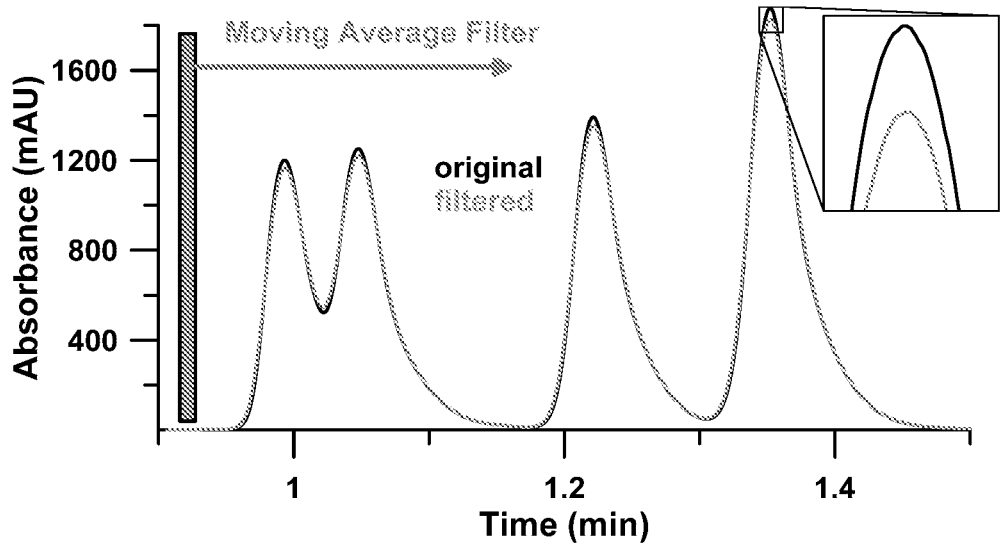
Figure 1C:
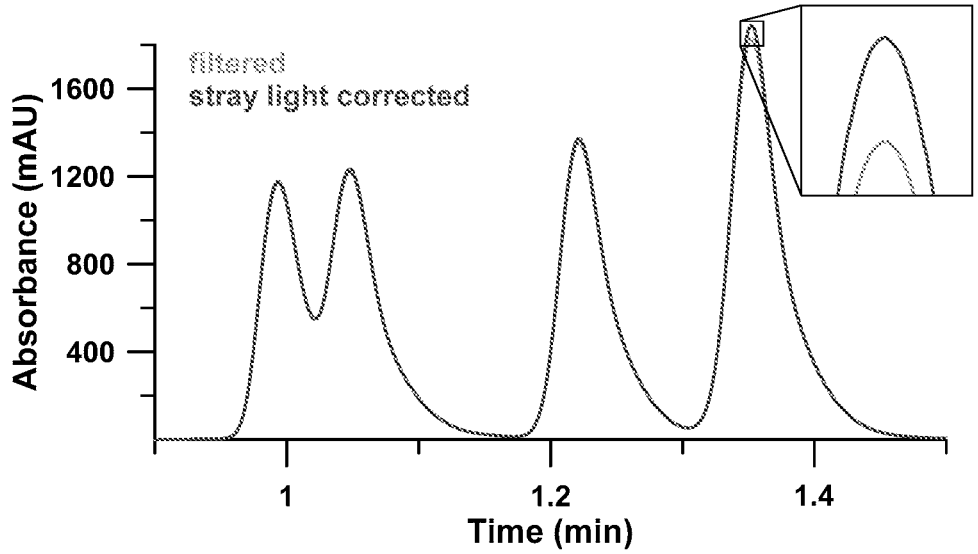
Figure 1D:
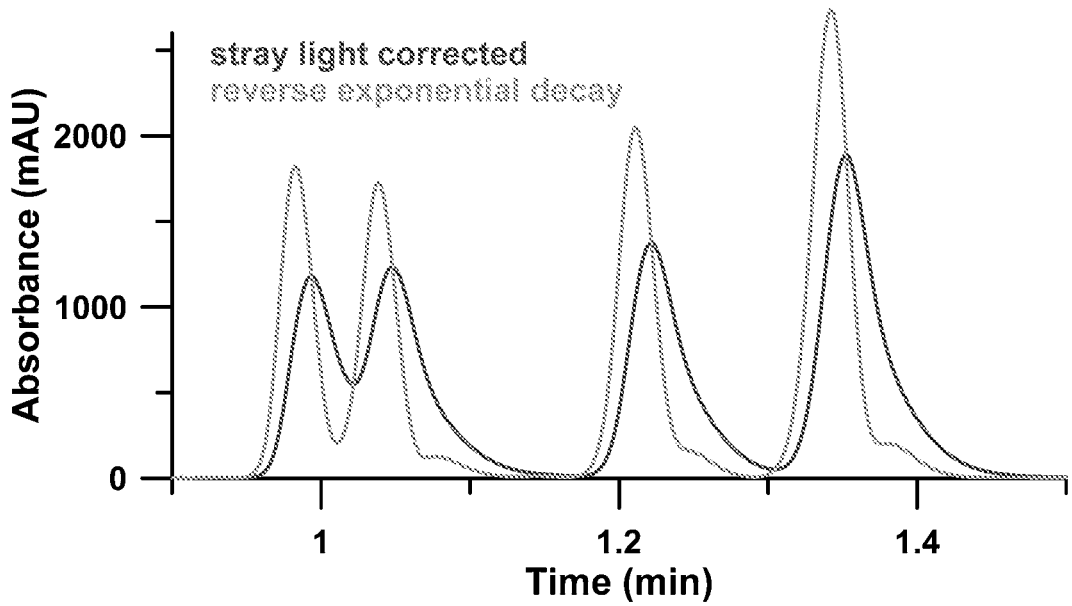
Figure 1E:
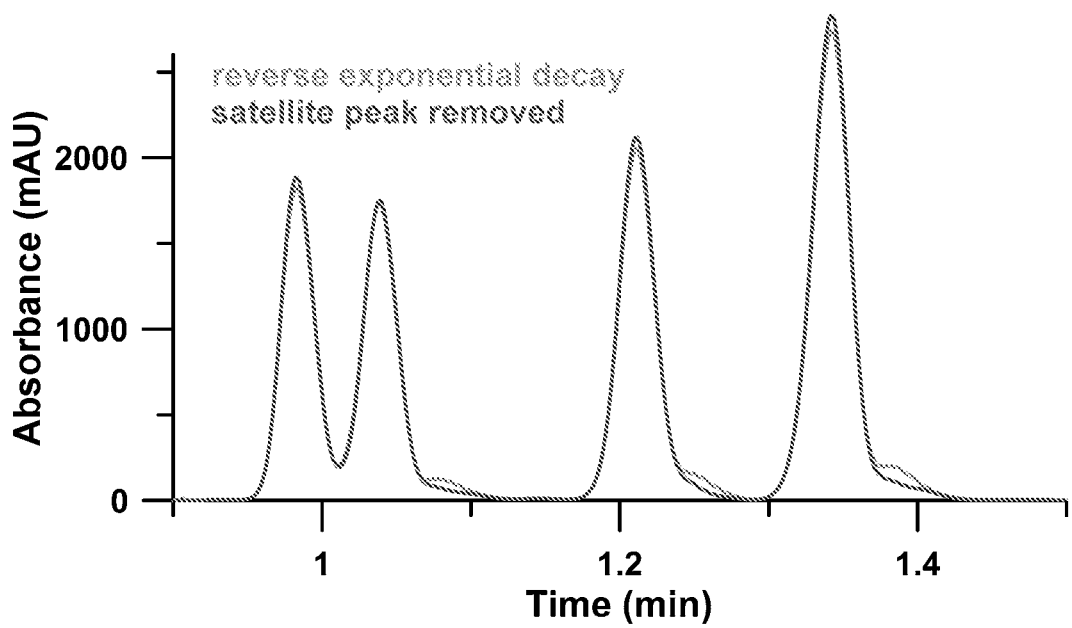

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In many separation or measurement systems, one has a choice in a specific dimension of a critical and essential component, all other things being equal. The choice of this dimensional parameter is often a compromise, because increasing the dimensional parameter may provide some desirable attributes, but will often do so at the expense of sacrificing other parameters. For example, in a high performance liquid chromatographic (HPLC) detection system that relies on measuring light absorption, measurement sensitivity improves with increased optical path length. However, dispersion of the chromatographically separated bands also increases with increasing path length, other factors remaining the same, thus deteriorating apparent chromatographic efficiency and resolution between adjacent bands. An ideal situation will be to have the sensitivity (signal to noise) afforded by a long path cell, while having the low dispersion characteristics of a short path cell. If one could obtain the signal to noise ratio (sensitivity) approaching that of a long path cell while approaching the low dispersion characteristics of a short path cell, that would be a heretofore unattained ideal.

Similarly, in the separation system itself, separation columns can come in a variety of lengths. A short column has the advantage of quick analysis time and low eluent consumption, but may suffer from inadequate resolution between two analyte peaks. In both long column and short column systems, analytes disperse as they move longitudinally.

In an aspect, a training or calibration system is described herein that is based on a model of dispersion. Input data from a short path length cell and data from a long path length cell are compared, and one or more parameters are derived that best fit the observed results. For the short cell data to long cell data, a simple dispersion model invoking a single exponential decay can be used. Each fluid element bearing concentration $C_0$ of an analyte of interest decays exponentially with time t as the fluid element moves forward $C_0\beta e^{-\alpha t}$ while conservation principles require that $\alpha$ and $\beta$ are interrelated through $\beta=(1-e^{-\alpha})$. Thus, a single parameter is sufficient to accurately describe this dispersion process.

Once the system is "trained" and thus "learns" how dispersion occurs from a short cell (an "S-array") to the long cell (an "L-array"), further experiments can be conducted using only a long cell. Specifically, the system can intelligently reverse dispersion by transforming the L-array into the S-array using $S_i(L_i-L_{i-1}*e^{-\alpha})/\beta$; indeed the system can transform any particular data for any particular cell to data corresponding to cells of lengths not only between the actual lengths used in the training but any other shorter or longer lengths, with signal to noise comparable to that of the original data.

In a similar fashion, under constant elution conditions, individual chromatographic bands move through a column at different characteristic velocities and also undergo temporal dispersion, often in an individual manner. In this case, when comparing the data between a long column and a short column, each analyte will have unique parameters connected to its movement and dispersion. However, applying methods described herein to chromatographic systems, which do not involve or invoke any particular chromatographic partition model or peak shape model, the methods can predict separation outcome for a column of any other length (shorter or longer) for a separation carried out under the same elution conditions of a sample containing the same analytes. In many cases, the dispersion parameter(s) ($\alpha$ and/or $\beta$) can be reasonably predicted from the rate at which the analyte peaks move through the column, in such a case individual determination of dispersion parameters for each analyte is not needed, the principle can be applied for any new analyte as well, based on its migration velocity along the column.

As an introduction, all flow-through measurement cells contribute to additional dispersion. With a well-designed inlet, it is the cell volume that primarily governs the extent of the dispersion. Absorbance detection (AD) cells are typically cylindrical, and dispersion increases with increases in the length of the AD cell. Moreover, as the diameter of the AD cell increases, dispersion increases even more so. Consequently, cell volume alone cannot indicate the degree of the induced dispersion. Notably, contrary to some belief, dispersion in the cell is flow rate dependent. Except for capillary on-column detectors with a radial light path, the cylindrical axis is used as the optical path to utilize the longest attainable path length.

For a fixed cell volume ($V_{cell}$), it may appear that a long narrow-bore cell is preferable in that both the dispersion is reduced and sensitivity is increased. However, a longer path results in a lower transmitted light intensity (I). In the ideal, shot-noise limited scenario, the transmittance noise is linearly related to $I^{-0.5}$. This increase in noise eventually overwhelms the greater signal benefit, thus resulting in an optimum path length ("optimum" purely from a signal/noise (S/N) aspect) at some intermediate length. For HPLC, this "optimum" path length is usually too long to be practical. If the volume is fixed, for a cylindrical cell of length L, the transmitted light intensity I decreases with $L^2$. Liquid core waveguide (LCW) cells brought about a paradigm change: here, at constant $V_{cell}$, I decreases with L, permitting long narrow bore cells.

The very first HPLC experiment adapted a 5 mm path flowcell to a benchtop spectrometer. The majority of past and present commercial HPLC absorbance cells have/had path lengths around 10 mm. Until the advent of LCW cells, typical bore was 1 mm. A 10-mm path choice retained comparability with bench top spectrophotometers. However, the superiority of shorter paths quickly became evident, with the first HPLC photodiode array detectors utilizing a 6 mm path. Indeed, currently a major manufacturer offers 7 mm path cells with different diameters, and a series of once popular HPLC detectors from Kratos/Schoeffel had both a shorter path (8 mm) and a wider bore (1.4 mm). Regardless, the reported data had always been normalized to 10 mm.

Dispersion caused by a post-column measurement cell can in some instances be large enough to be of concern. A compromise is therefore often necessary for a particular chromatographic scale and efficiency. However, sensitive absorbance measurement is one of the most challenging in open tubular chromatography. Literature has presented considerations to determine the optimum L (optimum from the viewpoint of overall band dispersion vs. the absorbance signal to noise ratio, S/N) for a fixed $V_{cell}$. Similar to impedance matching in electrical circuits, it is assumed an optimum where cell-induced dispersion equals the chromatographic dispersion; chromatographers, however, would prefer a much lower dispersion contribution of the cell.

Dispersion or band broadening has been a topic of critical interest. The effect that cell dispersion has on the appearance of a chromatogram has certain similarities with effects of the detector response time, albeit it is typically much easier to change the response time than detection cell dimensions. A novel approach to eliminate dispersion from longer path cell data to correspond to what would have been obtained for a shorter cell is disclosed.

I. General Method

When considering an exemplary 60 mm to 1 mm long cell reversal, it has been observed that signal to noise (S/N) decreases 16-fold when using raw chromatography data, but only ~2-fold when the data is first filtered using a standard rectangular moving average or Gaussian kernel moving average filter (see Table 1 herein). Yet the same filters applied to either long or short pathlength data only improve the S/N by 30-60%.

In an aspect, a method of converting long path cell signal data to short path cell signal data in a flow-through optical absorbance detector recording passage of transient analyte bands, comprises (a) obtaining a long path absorbance signal tracing and a short path absorbance signal tracing for at least one analyte band under the same conditions; (b) obtaining an approximate superimposable match between the long path absorbance signal tracing and the short path absorbance signal tracing using an amplitude scaling factor and one or more parameters derived from a dispersion model that accounts for dispersion differences between a short cell and a long cell; and (c) applying the dispersion model in reverse using the same parameters derived in (b) to future long path absorbance signal traces from the long path cell signal data to generate the short path cell signal data, wherein the long path cell signal data comprises the long path absorbance signal tracing and the short path cell signal data comprises the short path absorbance signal tracing. A flow chart depicting the entire computational process is provided in FIGS. 1A-1E.

The dispersion reversal model is given by Eq. (1):

$$Y_i = (W_i - W_{i-1} * e^{-\alpha})/\beta \qquad (1);$$

where $\alpha$ and $\beta$ are both positive and $\beta<1$, $\alpha$ and $\beta$ are related through $\beta=1-\exp(-\alpha)$, where $Y_i$ and $W_i$ are the respective dispersion reversed and measured chromatographic data at time t, and $\alpha$ is an empirically derived parameter in an exponential decay model that describes the observed dispersion. When the difference between two temporally adjacent signal values are computed according to Eq. (1), the difference in these values are very small, especially when a large sampling rate is used. The sampling rate of 80 Hz was the highest available in the equipment used and is far greater than necessary to maintain fidelity even for the sharpest peak in the chromatogram. The result of subtracting one signal value from another temporally nearest to it is dominated by noise intrinsic to each signal value. The noise contribution to each point thus becomes additive and decreases the signal to noise (S/N) of the final result.

In some embodiments, the dispersion model is a single exponential decay model; and an analyte concentration $C_0$ in each fluid element of a short cell signal array ($S_t$, wherein t ranging from t=0 to t=∞) exponentially disperses as $C_0 \beta e^{-\alpha t}$, a dispersed sum of all fluid elements at each time t constitutes the long cell signal array ($L_t$, t=0-∞), and $\alpha$ and $\beta$ together constitute a single adjustable parameter interrelated by the conservation principle through $\beta=1-\exp(-\alpha)$ and further that $\beta<1$, and short cell data $S_i$ being derived from $$S_i = (L_i - L_{i-1} * e^{-\alpha})/\beta \qquad (2).$$

In some instances, the dispersion model is a double exponential decay model; and the analyte concentration $C_0$ in each fluid element of a short cell signal array ($S_t$, t ranging from t=0 to t=∞) exponentially disperses as $C_0(\beta_1 e^{-\alpha t} + \beta_2 e^{-\gamma t})$ and a dispersed sum of all fluid elements at each time t constitutes a long cell signal array ($L_t$, t=0-∞).

In some cases, the dispersion model is a multiple exponential decay model that comprises n independent preexponential coefficients and n independent exponential coefficients and has 2n-1 independent adjustable parameters, through application of the conservation principle, wherein n is an integer.

The dispersion model can in some embodiments, be a generalized Gaussian curve, a Lorentzian curve, an exponentially modified Gaussian (EMG) function, or a polynomial modified Gaussian (PMG) function. In some instances, the dispersion model comprises a linear change of analyte concentration along a time axis.

Methods described herein can in some embodiments, further comprise improving a signal to noise ratio (SNR) of the generated shorter path cell data by applying a noise reduction filter to the long cell signal data prior to any processing. The application of the noise reduction filter can occur after step (a) of the method prior to performing step (b), at the beginning of step (c), or can be applied to a long cell signal data set that is to be converted to a corresponding short cell signal data without dispersion. In some cases, digital noise reduction filters can be used to improve S/N. In chromatography, these are typically some form of a low pass filter. Use of adjacent points in Eq. (1) may lead to high frequency noise in the result and application of almost any digital filters before further processing will improve S/N in the dispersion-reversed data. The filter effectively results in downsampling, which can be beneficial in some cases, such as instances where the original signal was oversampled.

In some cases, the noise reduction filter comprises a moving average filter (MAF). The MAF can comprise a rectangular kernel, a triangular kernel, a Gaussian kernel, or a polynomial function kernel.

In some embodiments, methods described herein can further improve a signal to noise ratio (SNR) of the generated short path cell data by applying a noise reduction filter to the generated short cell signal data. In some embodiments, the noise reduction filter comprises a moving average filter (MAF), a Butterworth filter (BF), a Savitsky-Golay filter (SGF), or a Chebyshev filter (CF). The Butterworth filter is of a $3^{rd}$, $4^{th}$, or $5^{th}$ order in some cases. The SGF is of a $3^{rd}$, $4^{th}$, or $5^{th}$ order in some cases. The CF can be of the $5^{th}$ order in some cases.

Methods described herein can further comprise removing satellite peaks from final processed data. In some cases, removing a satellite peak from the final processed data, comprises applying the following equation to the final processed data:

$$S_{ns,i} = \frac{1}{1-a} * S_{s,i} - a * S_{ns,i-n} \quad (3)$$

where $S_{ns}$ is a time dependent signal expected without any satellite peak, $S_{s,i}$ is the observed signal including a satellite peak, a is a ratio of the satellite peak amplitude to an expected principal peak without satellites, the expected satellite peak appearing n time units after the principal peak; and i referring to a point in time ranging from zero to infinity. Notably, output chromatogram actually depends on preceding data, and the dispersion reversed chromatogram from Eq. (1), $Y_i$.

Methods described herein can further comprise (a) dividing a signal area of a peak trace of the long cell signal data ($L_i$) by a signal area of a peak trace of the short cell signal data ($S_i$) in a training set to obtain a scaling factor f, and multiplying the $S_i$ data by f so that the multiplied short cell signal array ($MS_i$) has the same area as the $L_i$ signal data array, (b) reversing dispersion in $L_i$ to create a short cell data array ($NS_i$) using:

$$NS_i = (L_i - L_{i-1} * e^{-\alpha})/\beta \quad (4)$$

by choosing a value of α that results in a best match of $NS_i$ with $MS_i$ based on a lowest sum of squared residuals, wherein β is automatically defined through the conservation principle; (c) applying a noise reduction filter to a long cell signal data set that is to be converted to a corresponding short cell signal data without dispersion; and (d) reversing dispersion in $L_i$ to create simulated short cell signal data using the equation in (b) using a best-fit value of α. For step (a), signal area of a peak trace can comprise the area of a single peak trance, the sum of multiple peak trace areas, or the sum of all of the peak trace areas. In some cases, using the area of a single peak trace will completely resolve that peak from any of peak traces in both short cell and long cell applications.

In some instances, methods described herein further comprise (e) multiplying by a scaling factor to a short cell path of specified length.

In some cases, methods described herein further comprise (f) applying a final noise reduction filter.

Methods described herein can optionally further comprise correcting stray light in the first longer path cell signal data using:

$$A_{corr} = -\log\frac{(100+s)10^{-A}obs - s}{100} \quad (5)$$

to obtain a second longer path cell signal data set, wherein $A_{obs}$ is an observed absorbance value, $A_{corr}$ is a corrected absorbance value, and s is stray light expressed as percent of the main light.

In some embodiments, correction of stray light is performed when absorbances exceed a predetermined threshold.

II. General Method—Chromatographic Short Column to Long Column

In another aspect, a method of converting short column chromatographic separation data for a multiplicity of analytes, represented by detector response signal as a function of time, to corresponding long column chromatographic separation data, comprises (a) generating a short column separation signal tracing and a long column signal tracing for a given mixture of analytes under the same conditions; (b) obtaining an approximate superimposable match between the short column signal tracing and the long column signal tracing assuming each analyte moves at a unique velocity along the column and disperses in a analyte-specific manner along the column; (c) deriving one or more unique dispersion parameters from a dispersion model that accounts for dispersion differences of each analyte band between the short column and the long column; and (d) applying the dispersion model using the dispersion parameters derived in (c) to future short column signal traces to generate predicted longer column chromatographic separation data, wherein the predicted long column chromatographic separation data comprises long column signal tracing that would be hypothetically obtained on a longer column.

In some embodiments, the dispersion model of the chromatographic separation method is a single exponential decay model; wherein an analyte concentration $C_0$ in each fluid element of a short cell signal array ($S_t$, t ranging from t=0 to t=∞) exponentially disperses as $C_0\beta e^{-\alpha t}$, and a dispersed sum of all fluid elements at each time t constitutes the long cell signal array ($L_t$, t=0–∞); and wherein α and β together constitute a single adjustable parameter interrelated by the conservation principle through $\beta = 1 - \exp(-\alpha)$ and further that β<1, and short cell data $S_i$ being derived from $$S_i = (L_i - L_{i-1} * e^{-\alpha})/\beta \quad (2).$$

In some instances, the dispersion model of the chromatographic separation method is a double exponential decay model; and the analyte concentration $C_0$ in each fluid element of a short cell signal array ($S_t$, wherein t ranging from t=0 to t=∞) exponentially disperses as $C_0(\beta_1 e^{-\alpha t} + \beta_2 e^{-\gamma t})$ and a dispersed sum of all fluid elements at each time t constitutes a long cell signal array ($L_t$, t=0–∞).

In some cases, the dispersion model is any dispersion model described in Section I herein. In one embodiment, the dispersion model is a multiple exponential decay model that comprises n independent preexponential coefficients and n independent exponential coefficients and has 2n−1 independent adjustable parameters, through application of the conservation principle.

In some embodiments, similarly as described in Section I herein, the dispersion model of the chromatographic separation method can be a generalized Gaussian curve, a Lorentzian curve, an exponentially modified Gaussian (EMG) function, or a polynomial modified Gaussian (PMG) function.

For the chromatographic separation method, dispersion parameters(s) for each analyte are related by an empirically derived relationship to the respective axial velocity of that analytes, such as by a polynomial function.

Example 1

Chromatographic and Detection Setup

The chromatography system consisted of an Agilent G4204A quaternary pump, G1316C column compartment set to 30° C., and a G4226A high pressure autosampler. Chromatography was evaluated by a 0.5 μL injection of a test solution containing five analytes: dimethyl phthalate, diethyl phthalate, biphenyl, o-terphenyl, and bis(2-ethylhexyl) phthalate (0.15, 0.15, 0.01, 0.03 and 0.32% w/w, respectively) in 50% acetonitrile onto a 2.1×150 mm Poroshell (120 EC-C18, 2.7 μm) column, using 100% acetonitrile as eluent @350 µL/min. A variable path length LCW cell was based on a 0.53 mm silica capillary with a fixed fiber optic at one end and a movable fiber optic at the other. This permitted an absorbance measurement cell with a path length variable in the range of 0-60 mm. Chromatographic data was recorded at 80 Hz with a response time of 63 ms. A fixed 4 nm slit width was used. The 4 nm pixel bandwidth centered at 254 nm was averaged and referenced to the 360 nm signal averaged over 100 nm pixel bandwidth.

Example 2

Projecting 1-mm Cell Results from 60-mm Cell Data

Figure 2:
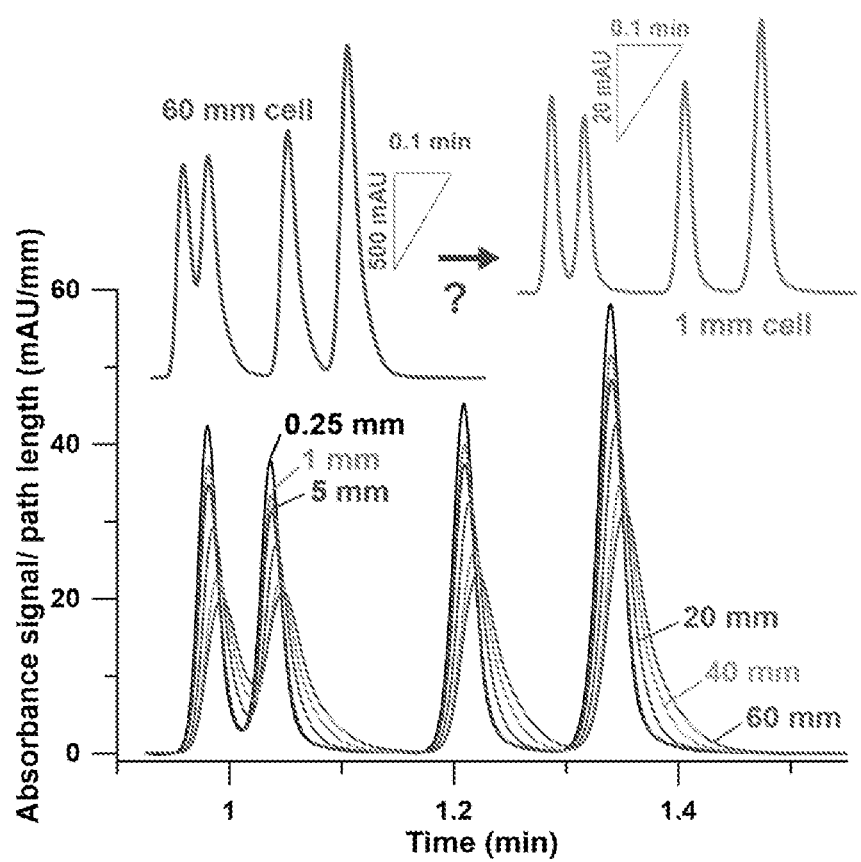
FIG. 2 is a graph showing dispersion that takes place in a conventional macroscale packed column system as the detection cell pathlength increases.

Multiple pathlengths in a HPLC absorbance detector provide an efficiency advantage for a short path cell and sensitivity advantage for the long path cell. In the macroscale, path lengths can be varied via a movable fiber optic as in the cell used here. However, simultaneous measurement at different path lengths is not possible. One commercial "high dynamic range" detection system comprises serial 3.7-mm and 60-mm path cells, with independent diode array detectors. Such dual detection capability of course significantly adds to the cost. FIG. 2 shows the dispersion that takes place in a conventional macroscale packed column system as the detection cell pathlength is increased for a 0.53 mm bore LCW cell. As shown, the observed efficiency decreases with increasing pathlength, with dispersion noticeably increasing with increasing pathlength. In FIG. 2, analytes dimethyl phthalate, diethyl phthalate, biphenyl and o-terphenyl represent the five peaks, from left to right, respectively, and peak 1 being the leftmost peak and peak 5 being the rightmost peak for reference purposes herein.

The question being addressed is whether one can take data generated from a longer path cell and eliminate the dispersion, since this is relevant for macroscale packed columns all the way to open tubular liquid chromatography (OTLC). Referring to FIG. 2, the ordinate is expressed as absorbance per unit path length. At the two shortest path lengths, the relative ordinate uncertainty is higher as the relative uncertainty of the exact pathlength increases. Rather than using peak heights as an index of dispersion, if one takes the valley between peaks 1 and 2 as the metric, chromatographic resolution and peak shape clearly begin to be affected for a path length beyond ~5 mm. The question is embodied in the top half of FIG. 2: Can one generate shorter path length outputs from longer path data?

To answer this question, data was collected in discrete time slices, and the short path limit is dictated by the temporal data resolution, i.e., the smallest virtual cell path length is the length the fluid moves in the time between the data slices.

Figure 3:
FIG. 3 shows an obverse of a boxcar integration approach.
Figure 4:
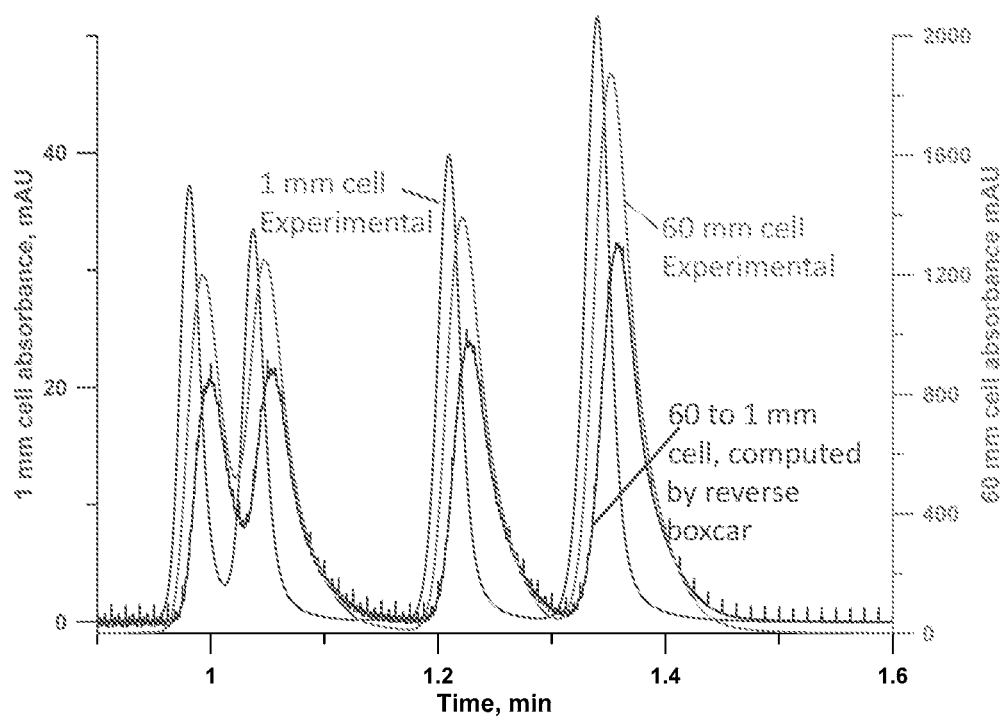
FIG. 4 is a graph showing reverse boxcar differentiation converting 60-mm cell data to 1-mm cell data does not match actual experimental data for a 1-mm cell.

As an example, 60-mm cell data is transformed to that expected for a 1-mm cell. The first step is essentially the obverse of a boxcar integration approach, as illustrated in FIG. 3, which assumes plug-like flow with the entire contents of a box transferred to the next (no dispersion). In FIG. 3, the cell is imagined as a series of 5 box cars. The row-wise depiction is 8 sequential snapshots of the cell in time. Flow goes from left to right. Initially all five boxes are filled with non-absorbing eluent (0 mAU, say). The total absorbance read (second column from right) is zero. During the observation of the second data point, the first box is filled with 1 mAU worth of absorption, the overall reading is the same and by subtracting the previous total from it, one is able to ascertain that the first box has been filled with 1 mAU worth of material (far right column). By the next snapshot, the contents of the leftmost box has moved over to the next one and the leftmost box now represents 3 mAU worth of absorption, the detector reading 4. By subtracting the previous reading the contents of each box are determined. This goes on until the 7th row where and whenceforth the contents of the rightmost box is now no longer in view. If reverse boxcar differentiation is carried out to convert 60-mm cell data to 1-mm cell data, it does not match the actual experimental data for a 1-mm cell (FIG. 4). As shown in FIG. 4, peaks are much wider, and at a fixed interval (equaling the assumed overall box length in the time domain, i.e., the average residence time assumed for a given fluid element in the cell). Unlike plug flow; between data slices, the contents of each box are not quantitatively transferred to the next box. FIG. 2 clearly shows evidence for dispersion, where increased cell length leads to increased tailing.

Figure 5:
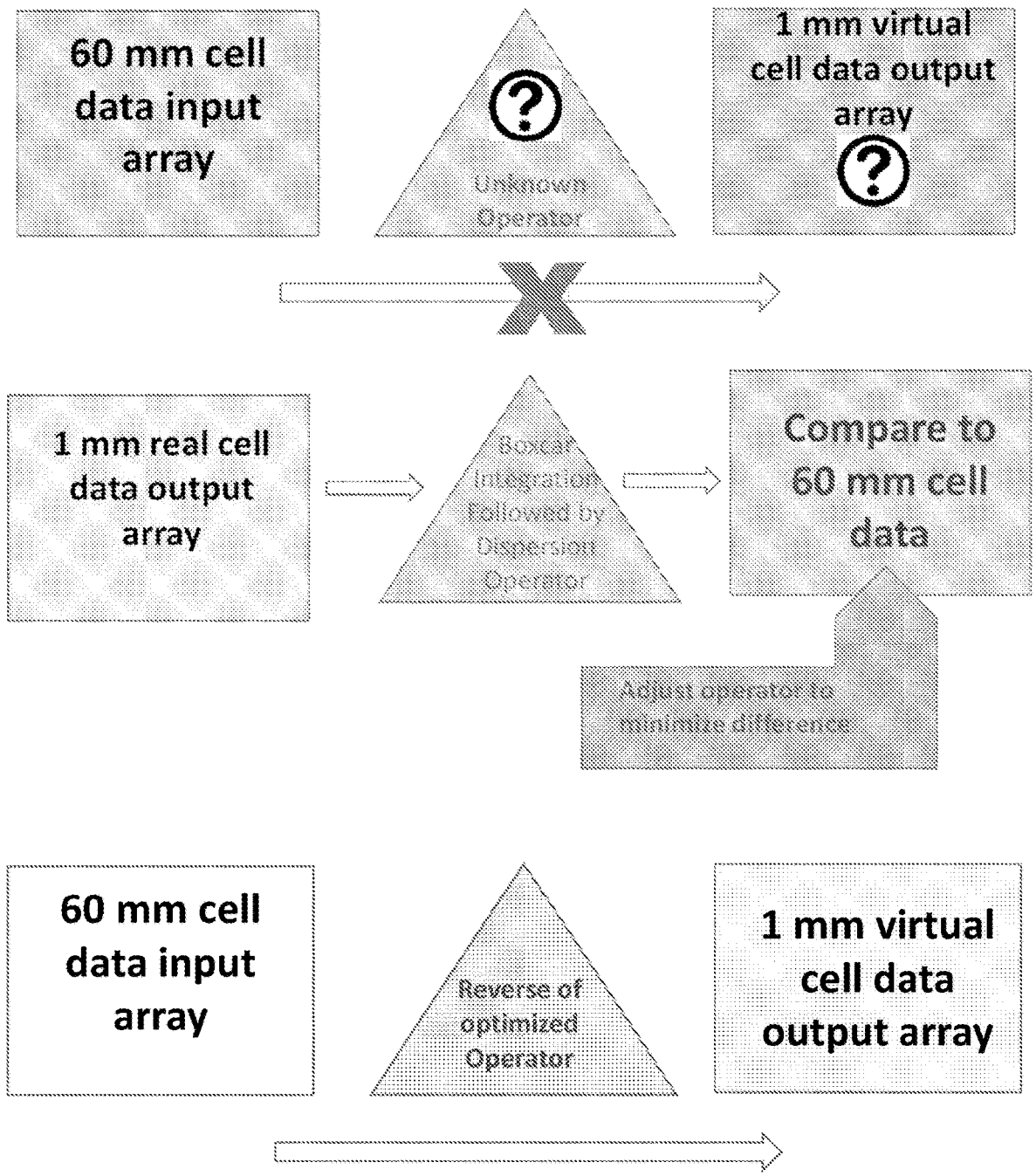
FIG. 5 is a flowchart showing standard boxcar integration and a dispersion model according to one of the methods described herein.

Since the 60-mm cell data could not be transformed to match the experimental behavior of a 1-mm cell, a backwards approach was taken: (a) standard boxcar integration is applied to the 1-mm cell experimental data with the requisite number of rows to produce the data for a 60-mm virtual cell, note that this procedure does not induce additional dispersion, (b) a dispersion model is used to apply an adjustable dispersion operator to the output from a to best-fit the actual data observed for a 60-mm cell, (c) reverse the operator developed in b and apply it to the 60-mm experimental cell data for the studied peak(s), (d) express the output from c in terms of absorbance/unit path length (e.g., divide by 60 in this case to express as AU/mm) and (e) multiply as desired by x if data for a virtual x mm path cell is desired and check how it matches with actual experimental data. Steps (a) and (b) are depicted in FIG. 5.

Figure 6:
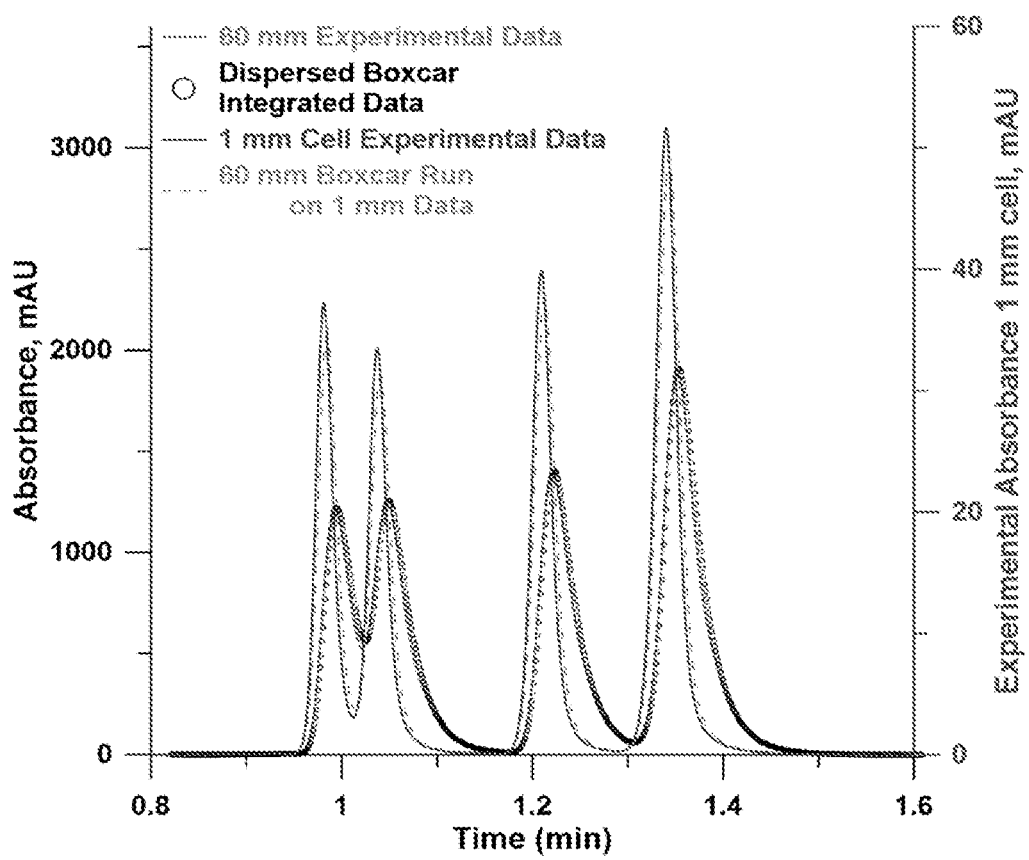
FIG. 6 is a graph showing experimental and dispersed 1-mm cell data and initial boxcar integration to generate corresponding data for a 60-mm cell.

FIG. 6 shows the experimental 1-mm cell data and the initial boxcar integration to make the corresponding data for a 60-mm cell. The primary input is the experimental data for the 1-mm cell (right ordinate—all other plots use the left ordinate, which use a 60× less sensitive scaling). Upon boxcar integration equivalent to that for a 60 mm cell path, a dashed line chromatogram is obtained that is nearly superimposable on the 1 mm cell experimental data trace indicating no loss of chromatographic performance. There is a barely perceptible shift to longer times that corresponds to the transit time difference between a 1-mm and a 60-mm cell. No significant deterioration of chromatographic performance was noted, suggesting correctable hydrodynamic dispersion is responsible for the observed deterioration of the peak shapes in the long cell.

To simulate dispersion, an exponential decay model is used. Referring to the boxcar-integrated 1-mm cell data (virtual 60-mm cell, output of step a) as the Y-array (all 4 peaks are treated together as a single data set: 0.5-1.6 min @80 Hz; i data points, i=5280), and the result of the dispersion, the W-array. All points in the $Y_i$-array undergo an exponential decay, each decayed function $Y_{i,t}'$ is an one dimensional array in time t:

$$Y_{i,t}' = \beta Y_i^* \exp(-\alpha t) \quad (6)$$

where $\alpha$ and $\beta$ are both positive and $\beta<1$. However, $\alpha$ and $\beta$ are related; conservation principles require that $\beta=1-\exp(-\alpha)$.

The W-array represents the dispersed peak, it is created by summing all the available $Y_{i,t}'$ values for any specific t to give:

$$W_i = W_{i-1} * e^{-\alpha} + Y_i^* \beta \quad (7)$$

Now the best-fit value of α (and hence β) are determined so that the computed W-array best fits the observed 60-mm cell data using a least squares minimization routine (such as MS Excel Solver: Note that the convergence is more rapid with 1/α as the adjustable parameter). The fit (FIG. 6, small black open circles) to the actual 60-mm cell data (red trace) is excellent.

A photometric correction can be applied if absorbances are high in the 60-mm cell. Whereas the overall absorbance in a 1-mm cell is typically small enough to show strict correspondence to Lambert's law, at high absorbances (approaching 2 AU, see FIG. 6) in a 60-mm cell, strict linearity between absorbance and pathlength is compromised. This loss of linearity arises mostly from stray light. The observed absorbance values ($A_{obs}$) were therefore corrected ($A_{corr}$) as:

$$A_{corr} = -\log\frac{(100+s)10^{-A_{obs}} - s}{100} \quad (5)$$

where s was the percent stray light (presently 0.2 was used). The correction is not large but perceptible at higher absorbances.

Figure 7:
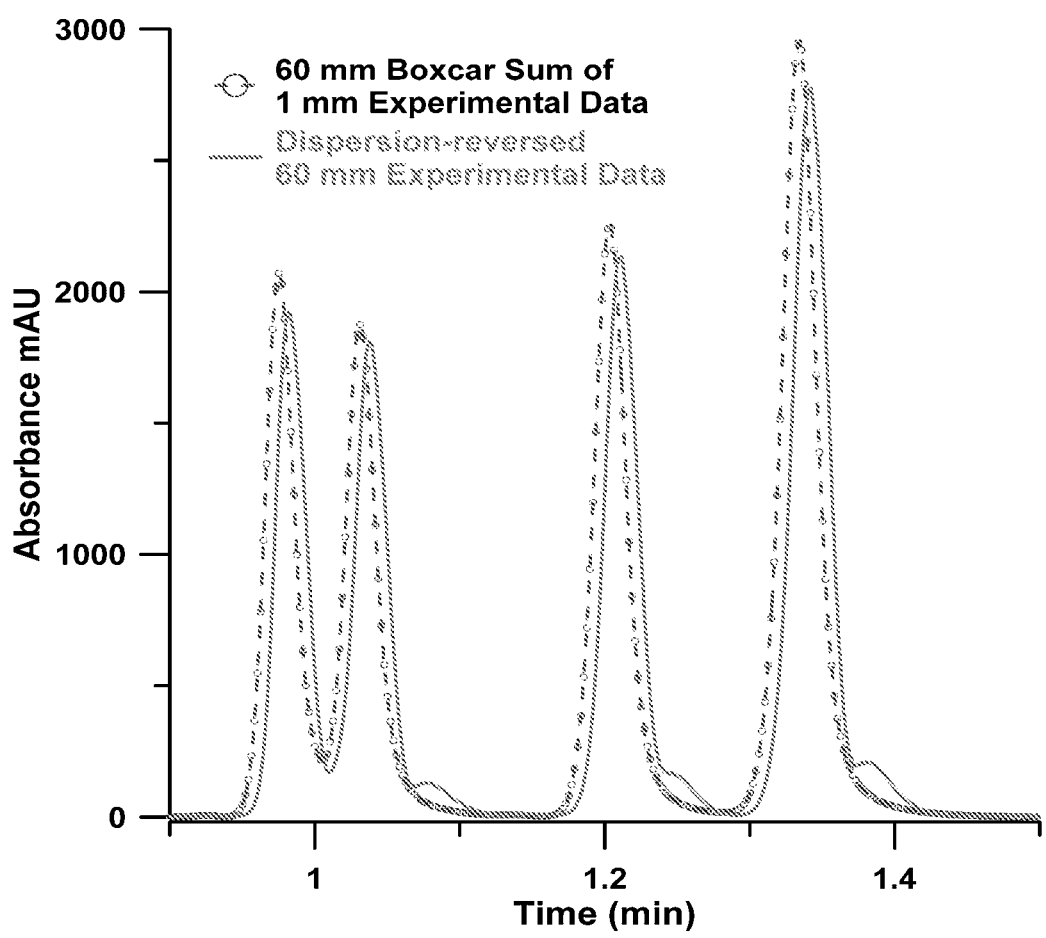
FIG. 7 is a graph showing comparison of dispersion reversed 60-mm equivalent cell data shown in FIG. 1D and that generated by boxcar-integrated 1-mm cell data.

An infinite data set assumption underlies the dispersion reversal process. Although all transformations are not readily reversible, inversion of Equation 7 results in:

$$Y_i = (W_i - W_{i-1} * e^{-\alpha})/\beta \quad (1)$$

and applied to the stray light corrected experimental 60-mm data using Equation 1 produces results close to the boxcar integrated sum of the 1-mm cell data, except for small satellite peaks that appear at 2.66 s after the main peaks as seen in solid line of FIG. 7. This is compared to 60-mm equivalent cell data (dashed trace) generated by boxcar-integrated 1-mm cell data. The satellite from the first peak is hidden in the valley between peaks 1 and 2. Detailed analysis shows that the satellites have the same shape as the main peaks but are of much lower amplitude (~3.3% of the main peaks). The time difference, within experimental error, is the transit time through the cell. Satellites are not discernible when the absolute difference in the pathlengths is less dramatic than that between a 60-mm and a 1-mm cell. For instance, satellites generally do not appear when performing dispersion reversal for 30 mm cell data to a 0.25 mm path. Note that the satellite—principal peak separation is related to the transit time difference while the satellite amplitude is related to the amplitude of the principal peak. As such, compared to a 60→1 mm conversion, a 30→0.25 mm conversion will make the satellite smaller and move it closer to the main peak, making it harder to discern and already small peak. There is also some evidence that the satellites originate due to a difference in the dispersion in the bulk of the cell vs. the cell outlet. As such, picking the longer path to be 60-mm, near the cell outlet, may lead to unique differences. Regardless, the satellites are easily corrected for. One may go back to the original model and add subtractive terms or correct it afterwards as is done below: If $X_t$ is the signal expected and $Z_r$ is the observed signal (including the satellite peaks), upon reversal:

$$Z_t = (1-a)X_t - aX_{t-n} \quad (8).$$

where a is the ratio of the satellite peak to actual peak expected, the satellite appearing n time units after, the reversal will be accomplished through:

$$X_t = 1/(1-a)Z_t - aX_{t-n} \quad (9).$$

Figure 8:
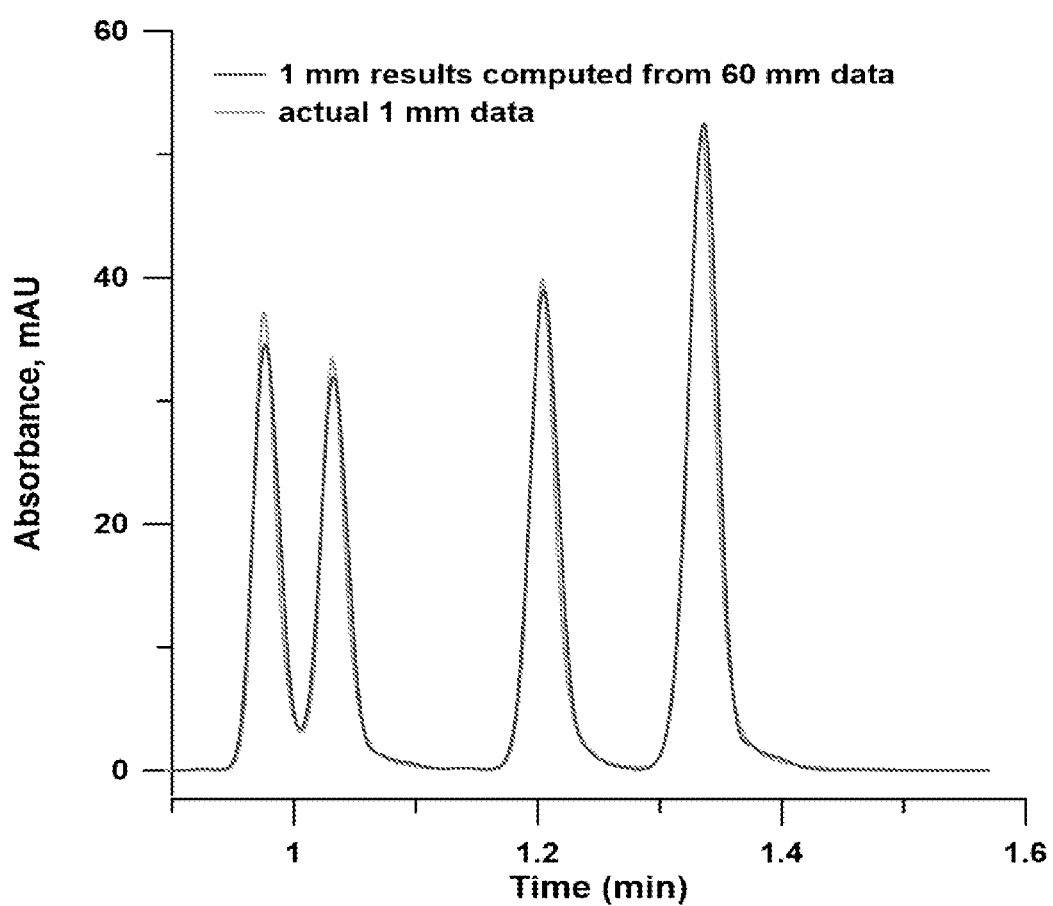
FIG. 8 is a graph comparing actual 1 mm path cell data and 1 mm path cell data computed from 60 mm cell data using methods described herein.

FIG. 8 is a graphical comparison of the actual 1 mm path cell data (orange) and 1 mm response computed from 60 mm cell data (blue), with satellite peak removal as described above. As shown, in some cases there is a slight underprediction at lower amplitudes and overprediction at higher amplitudes, primarily from imperfect photometric correction.

Figure 9:
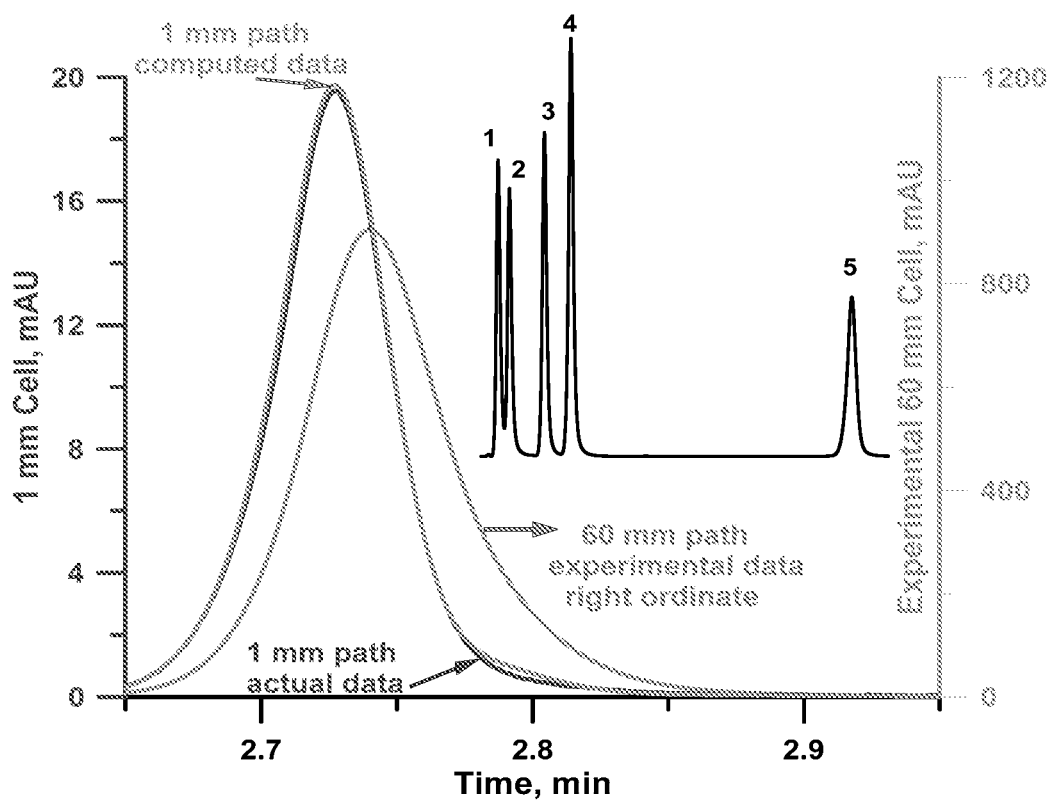
FIG. 9 is a graph with an inset of a full chromatogram containing a $5^{th}$ peak, the graph comparing actual 1 mm path cell data and 1 mm path cell data computed from 60 mm cell data of a $5^{th}$ peak using methods described herein.

While a good agreement in reversing dispersion in a set of data using parameters and procedures was obtained from the same set of data according to Example 1, this is meaningful only if the parameters that were derived from and shown to successfully work on the training set work on another unrelated peak obtained under similar conditions (same eluent, same flow rate). In the original chromatogram shown as an inset of FIG. 9, a fifth analyte, bis(2-ethylhexyl) phthalate, which is substantially larger in MW and size compared to the original four analytes, elutes significantly later (retention factor 1.90 compared to 0.11-0.43 for the first four peaks) than the original four analytes. This peak was not part of the initial training set. Unlike the other peaks of the original analytes, peak 5 noticeably fronts, $A_{s,0.1}$ is 0.9, compared to 1.2-1.3 for peaks 3 and 4. Application of the same α value derived for the first four analyte responses (as a whole) to peak 5, using sequentially dispersion reversal, satellite removal, and amplitude scaling (accounting for the pathlength difference) according to methods described herein, also provides an excellent match with what is experimentally observed in a 1-mm cell (FIG. 9). The observed dispersion is thus controlled by the hydrodynamics, not molecular diffusion. Thus, in most instances, every analyte would not require its own specific parameter, but a generally applicable dispersion parameter can be used for all analytes; this greatly increases the practical value of the described method.

Example 3

Noise Resulting from Method

The primary motivation of using a longer path cell generally is to improve S/N. The most optimistic view will be that if noise is not increased during the procedure, the S/N will increase, even compared to the long cell data, because signal amplitude increases due to dispersion removal. In practice, while the S/N may not equal that of the long cell, any S/N greater than that of the actual short path cell is an improvement. Herein, for any of the peaks described in Example 2, the volume of an individual peak is significantly larger than that of the short cell and is comparable to/somewhat larger than the long cell volume.

For experimental data of the $5^{th}$ peak in Example 2, the 60 mm experimental data has a S/N~24× higher than that of the 1 mm experimental data as shown in Table 1. The actual signal ratio is 45× compared to an ideal 60× (see FIG. 2) primarily due to dispersion. The additional deterioration in S/N is from increased noise due to poorer light throughput in a longer cell. The S/N for the virtual 1-mm data (generated from the 60-mm data) is 50% greater than the actual 1-mm data.

TABLE 1

Experimental Data for Peak 5

| Peak 5 Characteristics | | S/N[a] (Half-width, s) | |
|---|---|---|---|
| | No Filter | SMA Filter[b] | GKMA Filter[c] |
| Experimental  60 mm | 9790 (3.55) | 13000 (3.61) | 12700 (3.58) |
| data  1.0 mm | 408 (2.78) | 647 (2.85) | 617 (2.82) |
| Simulated 1.0 mm | 618 (2.69) | 6350 (2.76) | 6770 (2.73) |

Figure 10:
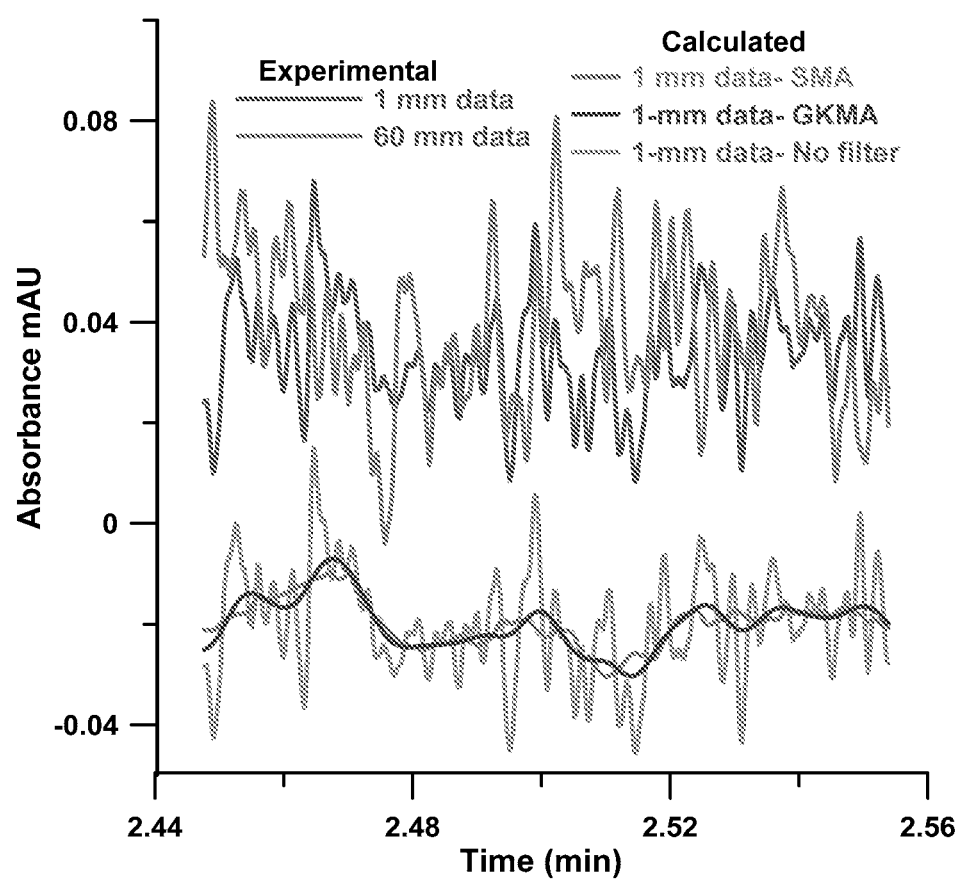
FIG. 10 is a graph shown experimental and calculated baseline noise traces for 1 mm and 60 mm path cells with and without different noise filters.

[a]S/N defined as peak amplitude/(4*baseline sd),
[b]standard (rectangular kernel) moving average filter,
[c]Gaussian kernel moving average filter It is believed that much of the noise originates in small differences in successive ordinate values for data obtained at relatively high sample rates. Smoothing the initial data and then undersampling the extant population can in some instances reduce the noise. As to postprocessing filtration, the analyte peak is observed over a longer period in a longer path cell, providing a reason to run a moving average filter. In Table 1 the results of postprocessing with a standard (rectangular kernel width 0.75 s, 60 data slices, SMA) and a Gaussian kernel moving average filter (standard deviation 0.175 s, 14 data slices, GKMA) are shown for Peak 5. As metrics, at 350 µL/min. the respective residence times for a 1- and 60-mm cells are 0.038 and 2.27 s. The ±2σ width of the GKMA filter is about the same as the rectangular kernel width of the SMA filter. In judging peak half-widths in Table 3, the uncertainty is ~0.02 s at a data rate of 80 Hz. The computed 1-mm data is marginally narrower in peak width than the actual experimental data; with the difference being nearly insignificant. The baseline noise traces are shown in FIG. 10. Applying either filter improves S/N 15.6-16.6×, with no plate loss relative to the original 1-mm cell data and 5% and 3% plate loss relative to the unfiltered computed 1-mm data for the SMA and GKMA filters, respectively. Compared to peak 5, the filter width and S/N gain may be smaller for narrower peaks. However, it is important to note that applying the same filters to the 1-mm and 60-mm path raw data barely improves the S/N, only by <1.6× and <1.3×, respectively.

Figure 11:
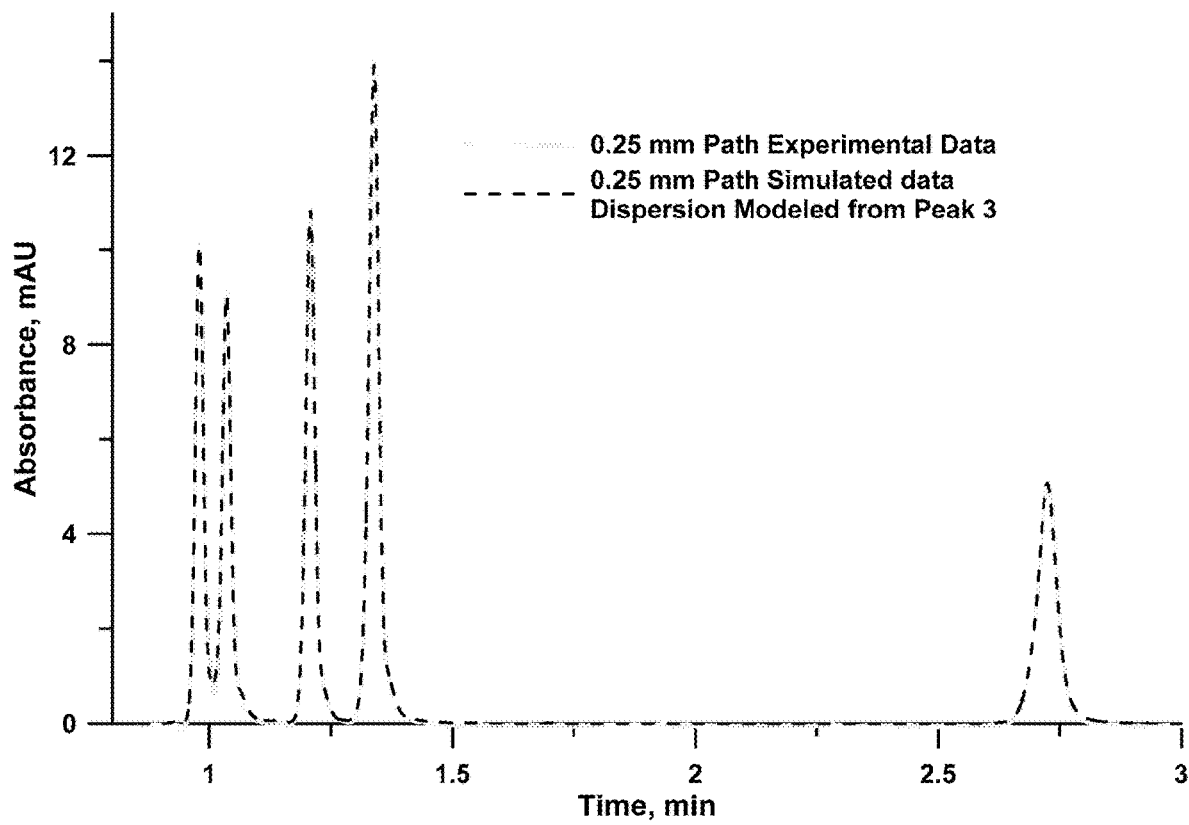
FIG. 11 is a graph of a chromatogram for a 0.25 mm path regenerated from data from a 30 mm path cell using a $3^{rd}$ peak to determine dispersion constants.
Figure 12:
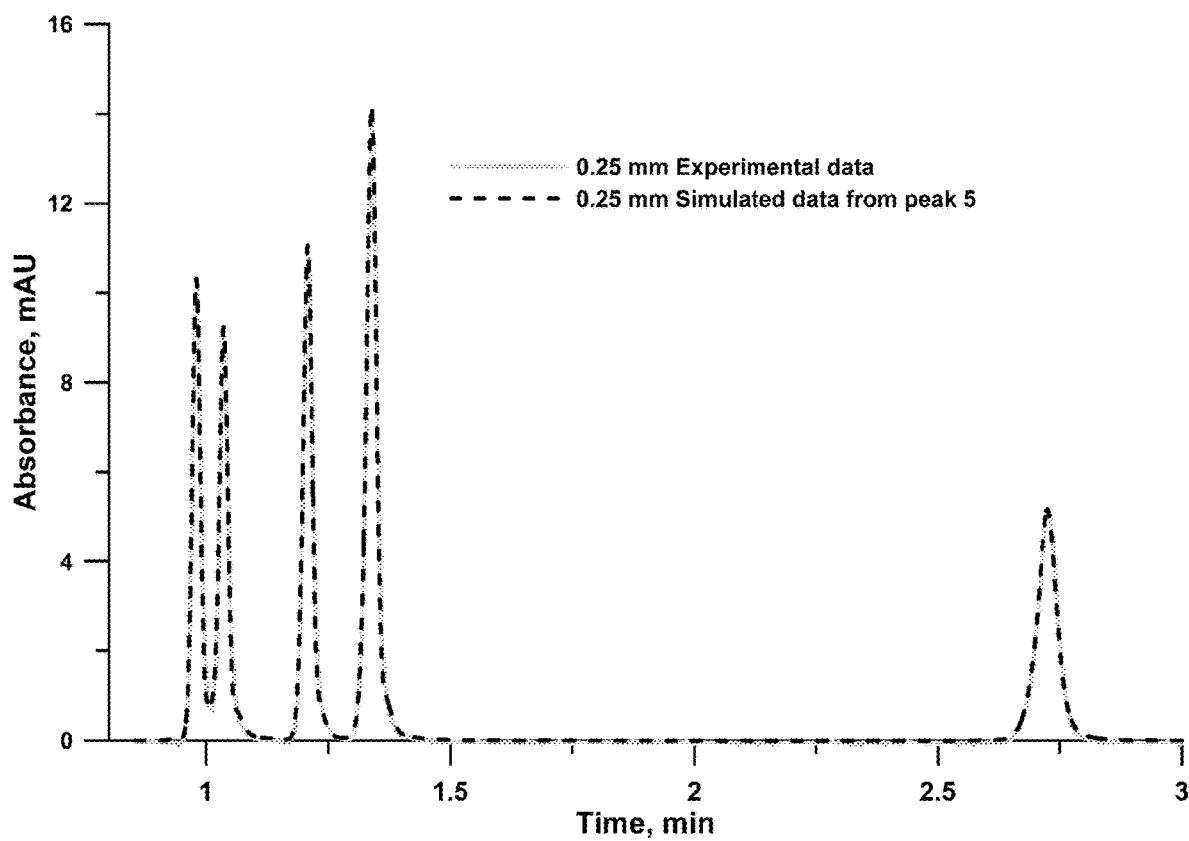
FIG. 12 is a graph of a chromatogram for a 0.25 mm path regenerated from data from a 30 mm path cell using a $5^{th}$ peak to determine dispersion constants.

The dispersion reversal approach proposed herein relies on the belief that the observed dispersion is hydrodynamically governed and under the same hydrodynamic conditions (meaning same eluent composition and flow rate, modest analyte concentrations that do not affect local viscosity), where all fluid elements are affected by dispersion in exactly the same way. This means the results should be the same whether any particular peak or combination of peaks is chosen to determine the nature of the dispersion occurring. FIGS. 11 and 12 show the results of transformation of 30-mm cell data to a 0.25 mm path using respectively peak 3 and 5 to model the dispersion. With a 120× difference in path length, this is a more challenging case than the previously described 60 mm to 1 mm transform. However, as shown, long cell absorbances were still within the linear domain. Specifically, for the simulation of 30 mm to 0.25 mm cell data, photometric correction was not necessary as the absorbance values were within the linear range. Additionally, no satellite peak was discernible, so no separate satellite steps were used to eliminate satellite peaks. This simplifies matters. The following two steps were taken. First, the peak area ratio of the 30-mm path data for the 0.25-mm path was computed and all the ordinate values for the 30-mm data are divided by this value to make a new peak area equal to that of the experimental 0.25 mm data. The reverse of the exponential decay (Eq. 1) was then applied, the nominal alpha value was adjusted for the best fit. This procedure obviates any need to carry out a forward dispersion of the short path data to match the long path data. The optimization is rapid because β has a value between 0 and 1. FIG. 11 is similar to FIG. 9, except the entire chromatogram for a 0.25 mm path is regenerated from data from a 30 mm path cell using only the region around peak 3 for modeling dispersion. FIG. 12 is similar to FIG. 11, except the entire chromatogram for a 0.25 mm path is regenerated from data from a 30 mm path cell using only the region around peak 5 for modeling dispersion. Importantly, regardless of which peak was used to model the dispersion, equally good results were obtained using the methods described herein: There is effectively no difference between FIGS. 11 and 12.

Example 4

Noise Reduction Filters

The effectiveness of noise reduction filters was explored using a 30 mm path as a long cell and 0.25 mm path as a short cell. LabView™ was used as the software platform throughout to filter the data prior to the dispersion reversal of the 30 mm path data to 0.25 mm path data. The 30 mm to 0.25 mm path transformation was previously observed to not generate any significant satellites, so only Eq (1) was applied.

Unless stated otherwise, the S/N figures in this Example refer to peak 1 (leftmost peak) of the 5 peaks in the chromatogram described Example 1. Peak 1 is the narrowest peak and is thus the most susceptible to being affected, broadened, and/or distorted by application of a noise reduction filter.

Noise was computed as follows. Eight separate 15 second segments of baseline that appeared to have the lowest levels of noise were identified. Each segment was corrected first for drift by applying a linear fit to the data, and subtracting the best fit predictions from the original array for drift correction. The peak to peak noise was then taken to be four times the average standard deviation of the eight baseline segments.

The S/N of the first peak of the unfiltered chromatograms and dispersion reversed 30 mm chromatogram are provided in Table 2 below. In this reversal, the best fit value of alpha (α) was obtained from the whole chromatogram using the methods previously described herein, and the same alpha value was simply used here. It is to be noted that the choice of the particular peak(s) to compute the alpha value does not matter.

TABLE 2

S/N of peak one in the unfiltered chromatograms.
Values are the average of 3 chromatograms.

| Chromatogram | S/N | $W_{0.5}$ (s) |
|---|---|---|
| 30 mm unfiltered | 11480 | 1.579 |
| 30 mm unfiltered reversed | 1448 | 1.138 |
| 0.25 mm unfiltered | 208.8 | 1.167 |

The S/N value of the original 30 mm path signal is 11480, almost 55× greater than the 0.25 mm path cell. Simply reversing dispersion of the 30 mm data without any filtration before or after produces a S/N of ~1450, ~7× better than the 0.25 mm path cell but ~8× worse than the original 30 mm data. Indeed, the S/N of the dispersion reversed reconstructed data is very close to the geometric mean of the actual 30 mm and 0.25 mm data. The other interesting aspect is that dispersion reversal produces a peak half-width slightly but discernibly (statistically) narrower than the actual 0.25 mm data. This is true of all other dispersion reversal experiments conducted.

A. Prefiltering

Figure 13:
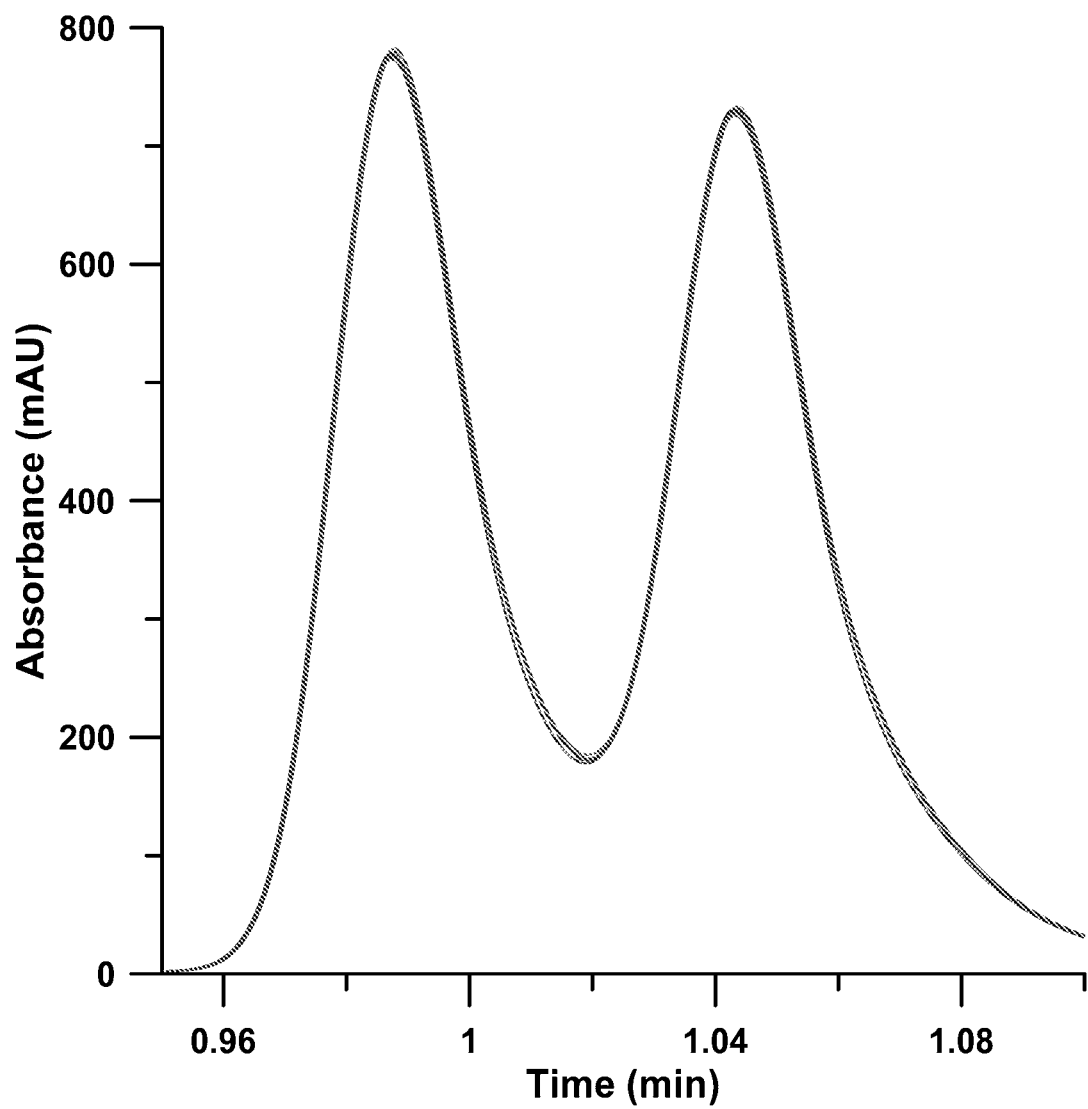
FIG. 13 is a graph showing overlay of 30 mm long pathlength raw data and 11 filtered chromatograms, the chromatograms including 2nd, 3rd, and 5th order Butterworth and Chebyshev filters, $3^{rd}$ and $5^{th}$ order Savitsky-Golay, a rectangular and triangular moving average, and an exponential filter.

Prefiltering the 30-mm data before dispersion reversal significantly improves overall S/N performance, as shown in Table 3. Filter conditions were chosen so that no significant increase of peak width occurred. S/N may differ, but, as shown in FIG. 13, the results indicate all produce little to no distortion. Specifically, FIG. 13 shows an overlay of 30 mm long pathlength raw data and 11 filtered chromatograms; peaks 1 and 2 described in Example 1 are shown. The chromatograms include $2^{nd}$, $3^{rd}$, and $5^{th}$ order Butterworth and Chebyshev filters, $3^{rd}$ and $5^{th}$ order Savitsky-Golay, a rectangular and triangular moving average, and an exponential filter.

TABLE 3

Width and S/N as a Function of Different filters used to apply to the Raw 30 mm Data Prior to Reversal according to Eq. (1)

|  |  | S/N |  | $W_{0.5}$ (s) |  |  |  |
|---|---|---|---|---|---|---|---|
| Raw 30 mm actual data |  | 11480 |  | 1.579 |  |  |  |
| Raw 0.25 mm actual data |  | 208.8 |  | 1.167 |  |  |  |

|  |  | \multicolumn{6}{c}{0.25 mm simulated} |
|---|---|---|---|---|---|---|---|
| Filter applied to 30 mm actual data | Filter Conditions | S/N | $W_{0.5}$, s | $\Delta W_{0.5}$, ms$^a$ | $\Delta W_{0.5}$, ms$^b$ | S/N gain$^c$ | S/N loss$^d$ |
| None |  | 1448 | 1.138 | −29 | — | 1.0 | 7.9 |
| Butterworth-2nd Order | 1 Hz | 10340 | 1.167 | 0 | 29 | 7.1 | 1.1 |
| Butterworth-3rd Order | 1 Hz | 11860 | 1.154 | −13 | 17 | 8.2 | 1.0 |
| Butterworth-5th Order | 1 Hz | 12740 | 1.142 | −25 | 4 | 8.8 | 0.9 |
| Chebyshev-2nd Order | Cutoff 0.5 Hz | 10880 | 1.154 | −13 | 17 | 7.5 | 1.1 |
| Chebyshev-3rd Order | Cutoff 1 Hz | 9334 | 1.138 | −29 | 0 | 6.4 | 1.2 |
| Chebyshev-5th Order | Cutoff 1 Hz | 11850 | 1.142 | −25 | 4 | 8.2 | 1.0 |
| Savitsky-Golay-3rd Order | 81 points wide | 10180 | 1.158 | −9 | 21 | 7.0 | 1.1 |
| Savitsky-Golay-5th Order | 121 points wide | 10360 | 1.146 | −21 | 8 | 7.2 | 1.1 |
| Rectangular Moving Average | 21 points wide | 5976 | 1.146 | −21 | 8 | 4.1 | 1.9 |
| Triangular Moving Average | 21 points wide | 4759 | 1.146 | −21 | 8 | 3.3 | 2.4 |
| Exponential Filter | Time constant 62.5 | 3114 | 1.150 | −17 | 13 | 2.2 | 3.7 |

$^a$relative to actual 0.25 mm cell peak FWHM
$^b$relative to reconstructed 0.25 mm cell peak FWHM
$^c$Gain relative to no prefiltering of 30 mm data
$^d$Loss relative to actual 30 mm cell data
Greyed cells indicate statistically insignificant differences As shown in Table 3, at least three of the filters, Butterworths $3^{rd}$ and $5^{th}$ order and Chebyshev $5^{th}$ order filters all produce S/N figures better than the raw 30 mm cell data. Although this is not theoretically expected, this likely comes from less dispersion (the peak gains in amplitude from sharpening). A clearer comparison is made between 30 mm raw data that has been filtered the same way, as shown in Table 4. It will be seen that in most cases the original filtered data has an S/N that is only 1.5× better.

10 points while the exponential filter optimal response time was 62.5 msec. The S/N in the raw 30 mm cell was 11480; following the application of the optimal digital filters this improved only to 13240-16110 as shown in Table 4.

B. Post-Filtration

The benefits to additional post-filtration after dispersion reversal were also explored. Specifically, the utility of $5^{th}$ order Chebyshev and $5^{th}$ order Savitsky-Golay filters were examined as post-filters after dispersion reversal, with those

TABLE 4

S/N of Filtered actual 30 mm cell Data vs. 0.25 mm Cell Data Generated Therefrom

| | 30 mm Cell Data | | | 0.25 mm Computed from 30 mm Data | | |
|---|---|---|---|---|---|---|
| Filter | S/N | $W_{0.5}$, s | $\Delta W_{0.5}$, ms$^a$ | S/N | $W_{0.5}$, s | S/N loss |
| Butterworth-2nd Order | 15380 | 1.592 | 12.5 | 10340 | 1.167 | 1.5 |
| Butterworth-3rd Order | 15670 | 1.571 | −8.3 | 11860 | 1.154 | 1.3 |
| Butterworth-5th Order | 16110 | | −16.7 | 12740 | 1.142 | 1.3 |
| Chebyshev-2nd Order | 15480 | 1.567 | −12.5 | 10880 | 1.154 | 1.4 |
| Chebyshev-3rd Order | 14910 | 1.588 | 8.3 | 9335 | 1.137 | 1.6 |
| Chebyshev-5th Order | 14990 | 1.571 | −8.3 | 11850 | 1.142 | 1.3 |
| Savitsky-Golay-3rd Order | 15020 | 1.596 | 16.7 | 10180 | 1.158 | 1.5 |
| Savitsky-Golay-5th Order | 14950 | 1.583 | 4.2 | 10360 | 1.146 | 1.4 |
| Rectangular Moving Average | 14190 | 1.600 | 20.8 | 5976 | 1.146 | 2.4 |
| Triangular Moving Average | 13640 | 1.592 | 12.5 | 4759 | 1.146 | 2.9 |
| Exponential Filter | 13240 | 1.592 | 12.5 | 3114 | 1.150 | 4.3 |

$^a$Greyed cells indicate statistically insignificant differences

The range of S/N after application of a filter and dispersion reversal is considerably broader than the range of S/N observed upon applying the same filters to the raw 30 mm cell data. Not all filters are equally effective for this purpose or and their effects predictable apriori. For example, while Butterworth and Chebyshev filters provide the highest S/N, the cutoff frequency has to be chosen very carefully as the peak distortion effects (such as dips) can be severe. In some cases, the Chebyshev filters perform slightly better than the Butterworth filters.

The Savitsky-Golay filter also provided good results and has some forgiving attributes: Overfiltering with this filter only resulted in peak broadening and loss of height, with no unexpected dips being observed. The Savitsky-Golay filter also does not introduce a time delay as the Chebyshev or Butterworth filters do.

Figure 14:
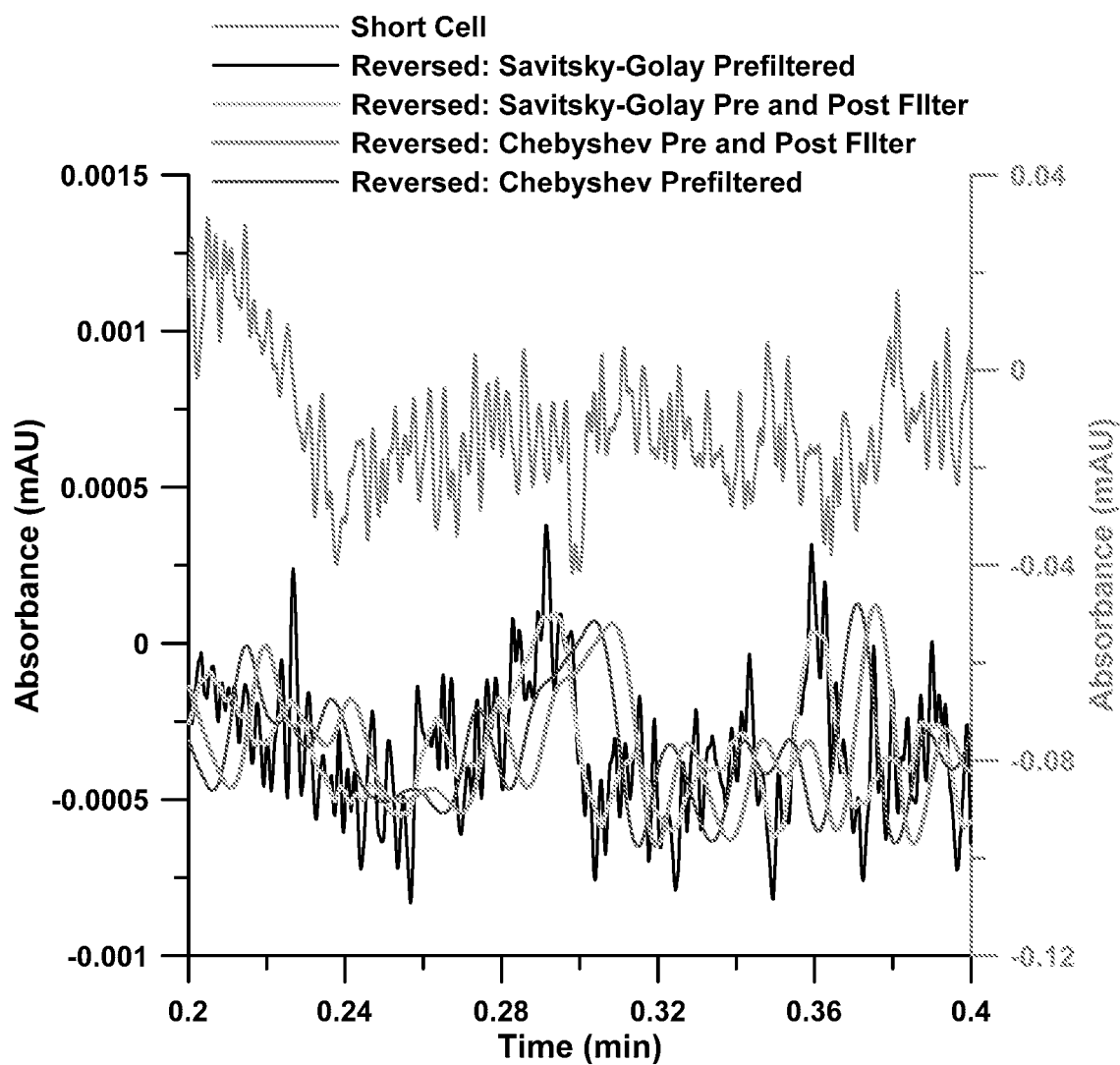
FIG. 14 is a graph showing average baseline standard deviation of a short cell (right axis) and a long cell (left axis). after pre and pre+post filtering using Savitsky-Golay or Chebyshev filters.

The filter effect upon a 30 mm cell chromatogram was first investigated to find the highest amount of filtration possible without resulting in any significant increase in peak half width. Butterworth and Chebyshev filters were tested using $2^{nd}$, $3^{rd}$ and $5^{th}$ order at 0.125-32.0 Hz (varied exponentially, 0.125, 0.25, 0.5 . . . etc.). Savitsky-Golay filtering was done using $3^{rd}$ or $5^{th}$ order and from 2-140 side points. Moving average filters were performed from 10-120 point half widths and the exponential filter response time was varied from 0.0125 to 0.5 s. The first peak in the chromatogram is the narrowest (full width at half height, $W_{0.5}$=1.579 s) and was used to determine when detectable broadening from the filter occurs; including losses in peak height in some instances. The value at which detectable broadening begins to occur was then used in the dispersion reversal and subsequent S/N comparisons. For the Butterworth filter, regardless of the order, broadening was detected at 1 Hz. The Chebyshev filter optimal cutoff was 0.5 Hz for the $2^{nd}$ order filter and 1 Hz for the $3^{rd}$ and $5^{th}$ order. Savitsky-Golay optimal parameters were 40 and 60 side points for the $3^{rd}$ and $5^{th}$ order filters respectively. The triangular and rectangular moving averages could only be used at a half width of same filters having been applied to the 30 mm cell raw data in Part A of this Example. Post-filtration with the Chebyshev filter resulted in at best a marginal increase in S/N: from 11850 to 12070. The Savitsky-Golay filter post-filtration did increase the S/N perceptibly, from 10360 to 12500. A small section of the baseline is shown demonstrating the effect of the filters in FIG. 14. The short cell noise is included for reference; note the axes differ by almost 2 orders of magnitude. There is no change in the overall baseline after applying a Chebyshev post-filter, it merely time shifts the data a small amount. However, a large improvement occurs from the Savitsky-Golay post-filter. Again, the baseline trends match those obtained using the Chebyshev, just shifted in time. The Chebyshev clearly does a better job of removing high-frequency noise prior to the dispersion correction leading to no advantage after the reversal while the Savitsky-Golay has preserved some high frequency noise which needs removed after reversal, hence proper postfiltering helps.

In summary, to convert long cell data to short cell data, the raw data should not be oversampled in many cases. Applying a filter to the raw data before dispersion reversal can dramatically improve S/N, with the attainable S/N being within a factor of 1.3 to 1.5 to the long cell S/N data in some instances, which has been further improved by application of the same filter. Moreover, in some cases, post-filtration after dispersion reversal can further improve the S/N.

The invention claimed is:
1. A method of chromatographically separating analyte bands, the method comprising:
(a) providing a chromatographic system comprising a pump, a column, an optical absorbance detector, and a variable path length liquid core waveguide (LCW) cell having a shorter path length and a longer path length;
(b) injecting a calibration sample containing a first analyte into the longer path length of the LCW cell under a set of hydrodynamic conditions, thereby obtaining a longer path absorbance signal tracing of the first analyte using the optical absorbance detector;

(c) injecting the calibration sample into the shorter path length of the LCW cell under the set of hydrodynamic conditions, thereby obtaining a shorter path absorbance signal tracing of the first analyte using the optical absorbance detector;

(d) obtaining a superimposable match between the longer path absorbance signal tracing and the shorter path absorbance signal tracing based on an amplitude scaling factor and one or more parameters derived from a dispersion model that accounts for the dispersion of the shorter path length of the LCW cell compared to the dispersion of the longer path length of the LCW cell;

(e) injecting a test sample containing a second analyte into the longer path length of the LCW cell under the set of hydrodynamic conditions, thereby collecting longer path cell signal data for the second analyte using the optical absorbance detector;

wherein the chromatographic system is configured to apply the dispersion model in reverse to the longer path cell signal data of the second analyte to generate shorter path cell signal data for the second analyte; and (f) obtaining shorter path cell signal data for the second analyte, wherein the longer path cell signal data comprises the longer path absorbance signal tracing and the shorter path cell signal data comprises the shorter path absorbance signal tracing.

2. The method of claim 1, wherein:
the dispersion model is a single exponential decay model; and
an analyte concentration Co in each fluid element of a short cell signal array (St, wherein t ranging from t=0 to t=∞) exponentially disperses as $C_0 \beta e^{-\alpha t}$,
a dispersed sum of all fluid elements at each time t constitutes the long cell signal array ($L_t$, t=0-∞), and
α and β together constitute a single adjustable parameter interrelated by the conservation principle through $\beta = 1 - \exp(-\alpha)$ and further that β<1, and short cell data $S_i$ being derived from $S_i = (L_i - L_{i-1}^* e^{-\alpha})/\beta$.

3. The method of claim 1, wherein:
the dispersion model is a double exponential decay model; and
the analyte concentration $C_0$ in each fluid element of a short cell signal array ($S_t$, t ranging from t=0 to t=∞) exponentially disperses as $C_0(\beta_1 e^{-\alpha t} + \beta_2 e^{-\gamma t})$ and a dispersed sum of all fluid elements at each time t constitutes a long cell signal array ($L_t$, t=0-∞).

4. The method of claim 1, wherein the dispersion model is a multiple exponential decay model that comprises n independent preexponential coefficients and n independent exponential coefficients and has 2n–1 independent adjustable parameters, through application of the conservation principle.

5. The method of claim 1, wherein the dispersion model is a generalized Gaussian curve.

6. The method of claim 1, wherein the dispersion model is a Lorentzian curve.

7. The method of claim 1, wherein the dispersion model is an exponentially modified Gaussian (EMG) function.

8. The method of claim 1, wherein the dispersion model is a polynomial modified Gaussian (PMG) function.

9. The method of claim 1, wherein the dispersion model comprises a linear change of analyte concentration along a time axis.

10. The method of claim 1, further comprising applying a noise reduction filter to the longer path cell signal data of the second analyte prior to any processing.

11. The method of claim 10, wherein the noise reduction filter comprises a moving average filter (MAF).

12. The method of claim 11, wherein the MAF has a rectangular kernel.

13. The method of claim 11, wherein the MAF has a triangular kernel.

14. The method of claim 11, wherein the MAF has a Gaussian kernel.

15. The method of claim 11, wherein the MAF has a polynomial function kernel.

16. The method of claim 10, wherein the noise reduction filter comprises a Butterworth filter (BF).

17. The method of claim 16, wherein the Butterworth filter is of $5^{th}$ order.

18. The method of claim 10, wherein the noise reduction filter comprises a Savitsky-Golay filter (SGF).

19. The method of claim 18, wherein the noise reduction filter comprises an SGF of the $5^{th}$ order.

20. The method of claim 10, wherein the noise reduction filter comprises a Chebyshev filter (CF).

21. The method of claim 20, wherein the noise reduction filter comprises a CF of the $5^{th}$ order.

22. The method of claim 10, comprising applying a noise reduction filter to the shorter path cell signal data of the second analyte.

23. The method of claim 22, wherein the noise reduction filter comprises a moving average filter (MAF), a Butterworth filter (BF), a Savitsky-Golay filter (SGF), or a Chebyshev filter (CF).

24. The method of claim 1 further comprising removing a satellite peak from the shorter path cell signal data of the second analyte using:

$$S_{ns,i} = \frac{1}{1-a} * S_{s,i} - a * S_{ns,i-n}.$$

where $S_{ns}$ is a time dependent signal expected without any satellite peak, $S_{s,i}$ is the observed signal including a satellite peak, α is a ratio of the satellite peak amplitude to an expected satellite peak, the expected satellite peak appearing n time units after; and i referring to a point in time ranging from zero to infinity.

25. The method of claim 1, wherein the test sample comprises a multiplicity of analytes.

26. The method of claim 1, wherein the set of hydrodynamic conditions comprise one or more of eluent composition, flow rate, and analyte concentration.

27. The method of claim 1, wherein the chromatographic system is a gas chromatographic system or a liquid chromatographic system and the optical absorbance detector is an ultraviolet/visible light detector.

28. The method of claim 27, wherein the chromatographic system is an open tubular liquid chromatographic system.

29. The method of claim 1, wherein the LCW cell is attached to a fixed fiber optic and a movable fiber optic.

* * * * *